(12) United States Patent
Ho

(10) Patent No.: US 11,015,705 B2
(45) Date of Patent: May 25, 2021

(54) BICYCLE CONTROL SYSTEM

(71) Applicant: SRAM, LLC, Chicago, IL (US)

(72) Inventor: Alexander Kon-I Ho, Chicago, IL (US)

(73) Assignee: SRAM, LLC, Chicago, IL (US)

( * ) Notice: Subject to any disclaimer, the term of this patent is extended or adjusted under 35 U.S.C. 154(b) by 189 days.

(21) Appl. No.: 16/251,711

(22) Filed: Jan. 18, 2019

(65) Prior Publication Data

US 2020/0231249 A1 Jul. 23, 2020

(51) Int. Cl.
*F16H 61/02* (2006.01)
*B62K 23/06* (2006.01)
*B62M 9/122* (2010.01)
*B62M 9/123* (2010.01)
*B62M 25/04* (2006.01)
*B62M 25/08* (2006.01)
*B62M 9/132* (2010.01)

(52) U.S. Cl.
CPC ......... *F16H 61/0204* (2013.01); *B62K 23/06* (2013.01); *B62M 9/122* (2013.01); *B62M 9/123* (2013.01); *B62M 9/132* (2013.01); *B62M 25/04* (2013.01); *B62M 25/08* (2013.01)

(58) Field of Classification Search
CPC ... F16H 61/0204; B62M 9/122; B62M 9/123; B62M 9/132; B62M 9/133; B62M 25/08
See application file for complete search history.

(56) References Cited

U.S. PATENT DOCUMENTS

| | | | |
|---|---|---|---|
| 5,356,348 A | 10/1994 | Bellio et al. | |
| 5,577,969 A | 11/1996 | Watarai | |
| 5,865,454 A | 2/1999 | Campagnolo | |
| 5,970,816 A | 10/1999 | Savard | |
| 8,712,656 B2 | 4/2014 | Lee | |
| 8,882,122 B2 | 11/2014 | Emura et al. | |
| 9,302,737 B2 | 4/2016 | Kuroda | |
| 9,669,901 B2 | 6/2017 | Hashimoto et al. | |
| 2014/0070930 A1 | 3/2014 | Hara | |
| 2015/0180517 A1 | 6/2015 | Abe et al. | |
| 2015/0210354 A1* | 7/2015 | Kuroda | B62M 9/12 474/70 |
| 2015/0307157 A1 | 10/2015 | Gao | |
| 2016/0167738 A1* | 6/2016 | Fukao | F16H 61/684 701/52 |
| 2017/0008465 A1* | 1/2017 | Kasai | B62M 9/132 |
| 2017/0203814 A1* | 7/2017 | Kurokawa | B62K 19/36 |

* cited by examiner

*Primary Examiner* — Edwin A Young

(57) ABSTRACT

A bicycle control system may be provided to control a first gear changer with a control unit and a second gear changer with the first gear changer. The control unit may control both first and second gear changers. The system includes a predetermined shift path and may transition in and out of the predetermined shift path responsive to various controls. Shifts out of the predetermined shift path may be recovery shifts where both first and second gear changers are controlled.

20 Claims, 22 Drawing Sheets

|  | F2 | | F1 | |
|---|---|---|---|---|
| R12 | U15 | D1 | Y3 | Y6 |
| R11 | U14 | D2 | Y2 | Y5 |
| R10 | U13 | D3 | Y1 | Y4 |
| R9 | U12 | D4 | U9 | X3 |
| R8 | U11 | D5 | U8 | X2 |
| R7 | U10 | D6 | U7 | X1 |
| R6 | W3 | D7 | U6 | D10 |
| R5 | W2 | D8 | U5 | D11 |
| R4 | W1 | D9 | U4 | D12 |
| R3 | Z3 | Z6 | U3 | D13 |
| R2 | Z2 | Z5 | U2 | D14 |
| R1 | Z1 | Z4 | U1 | D15 |

FIG. 19

BICYCLE CONTROL SYSTEM

FIELD OF THE DISCLOSURE

The present application generally relates to control systems for bicycles, and more particularly to an electromechanical shifting system for a bicycle.

BACKGROUND OF THE INVENTION

A bicycle may be equipped with a transmission having a shifting system. The shifting system may be an electromechanical control system. Electromechanical control systems may be used to accurately and efficiently change between gear ratios of a bicycle transmission. Wireless electromechanical shifting systems may be used to decrease system complexity. For example, bicycles may be designed without need for routing of wires between components of the transmission. Aerodynamic and weight benefits may be realized as well, since use of wireless electromechanical shifting systems on aerodynamically designed frames minimize or eliminate the need to accommodate cable routing and thus can be made lighter and more streamlined. Internal or external frame features to route transmission conduits also need not be included.

The rider or mechanic may further benefit from a wireless control system. A wireless system may have components installed virtually anywhere on the bicycle or the rider. For instance, a time trial bicycle may have duplicate sets of wireless controls to facilitate use by the rider in various hand positions. Wireless control systems may also increase ease of installation, adjustment, and maintenance. For instance, wireless controls not connected by wires may be more easily installed, moved, and replaced than similar controls being routed to other components of the bicycle by wire.

A control system may be configured to operate multiple components of a bicycle drivetrain. For example, front and rear gear changers may be operated. Front and rear gear changers may operate by moving a chain between adjacent sprockets. Different transmission ratios may be achieved by arranging sprockets of differing radii adjacently in front and rear sprocket assemblies. In such assemblies, it may be advantageous to have a greater or lesser relative change between adjacent sprockets on one sprocket assembly and adjacent sprockets on another sprocket assembly. For example, the front gear changer may shift between adjacent sprockets having a relatively large difference in radius and the rear gear changer may shift between adjacent sprockets having a relatively small difference in radius. The front gear changer may be a toggling device, operable to switch between two adjacent sprockets. In these ways, large gear ratio ranges may be provided for the rider, while also maintaining small steps between many gear ratio changes.

Shifting between adjacent sprockets having a relatively large radius change therebetween may present a difficult transition for a rider. A rider may have to perform multiple shifting operations to reduce the total change to drive ratio. Alternatively, a rider may avoid shifting between these large gear ratio change gaps, leading to inefficient drivetrain operation. For example, a cross chain scenario may be presented by a rider who does not operate the front gear changer inboard to decrease drive ratio until the rear gear changer is not able to move further inboard from decreasing drive ratio shifts.

It is an object of the present disclosure to present operation of a wireless control system that operates a multiple sprocket assembly drivetrain efficiently through small steps across a broad range of drive ratios. There is a need for a wireless drivetrain that efficiently communicates between individual wireless components to optimize drive ratio changes across a defined range.

SUMMARY

One aspect of the invention provides an electromechanical shifting system for a bicycle, having a first gear changer including a first processor, a first operation device, and a first communication device. The first processor is configured to control a first movement of the first operation device, generate a first signal indicative of a first motion status, and transmit the first signal using the first communication device. A second gear changer includes a second processor, a second operation device, and a second communication device. The second processor is configured to receive the first signal using the second communication device and control a second movement of the second operation device.

Another aspect of the invention provides an electromechanical shifting system for a bicycle, having a predetermined shift path, having: a plurality of first gear positions; a plurality of second gear positions; and a change position at which a first gear changer performs a first gear changer shift between the plurality of first gear positions in a first direction and the second gear changer performs a second gear changer shift between the plurality of second gear positions in a second direction. A first signal is configured to control an upward path shift to a higher ratio gear selection within the predetermined shift path; a second signal configured to control a downward path shift to a lower ratio gear selection within the predetermined shift path; and a third signal configured to control a path exit shift outside of the predetermined shift path, wherein the path exit shift comprises shifting between the plurality of first gear positions and the plurality of second gear positions.

Yet another aspect of the invention provides an electromechanical shifting system for a bicycle, having a control unit; a first gear changer; and a second gear changer. The first gear changer and the second gear changer are configured to: shift up through a plurality of gear combinations of a predetermined shift path responsive to a first signal transmitted by the control unit; shift down through the plurality of gear combinations of the predetermined shift path responsive to a second signal transmitted by the control unit; shift to an outside gear combination that is not one of the plurality of gear combinations of the predetermined shift path responsive to a third signal transmitted by the control unit; and shift into one of the plurality of gear combinations of the predetermined shift path responsive to at least one of the first signal and the second signal transmitted by the control unit.

BRIEF DESCRIPTION OF THE DRAWINGS

FIG. 19 is a diagram of shift positions;

Other aspects and advantages of the embodiments disclosed herein will become apparent upon consideration of the following detailed description, wherein similar or identical structures have similar or identical reference numerals.

DETAILED DESCRIPTION

Figure 1:
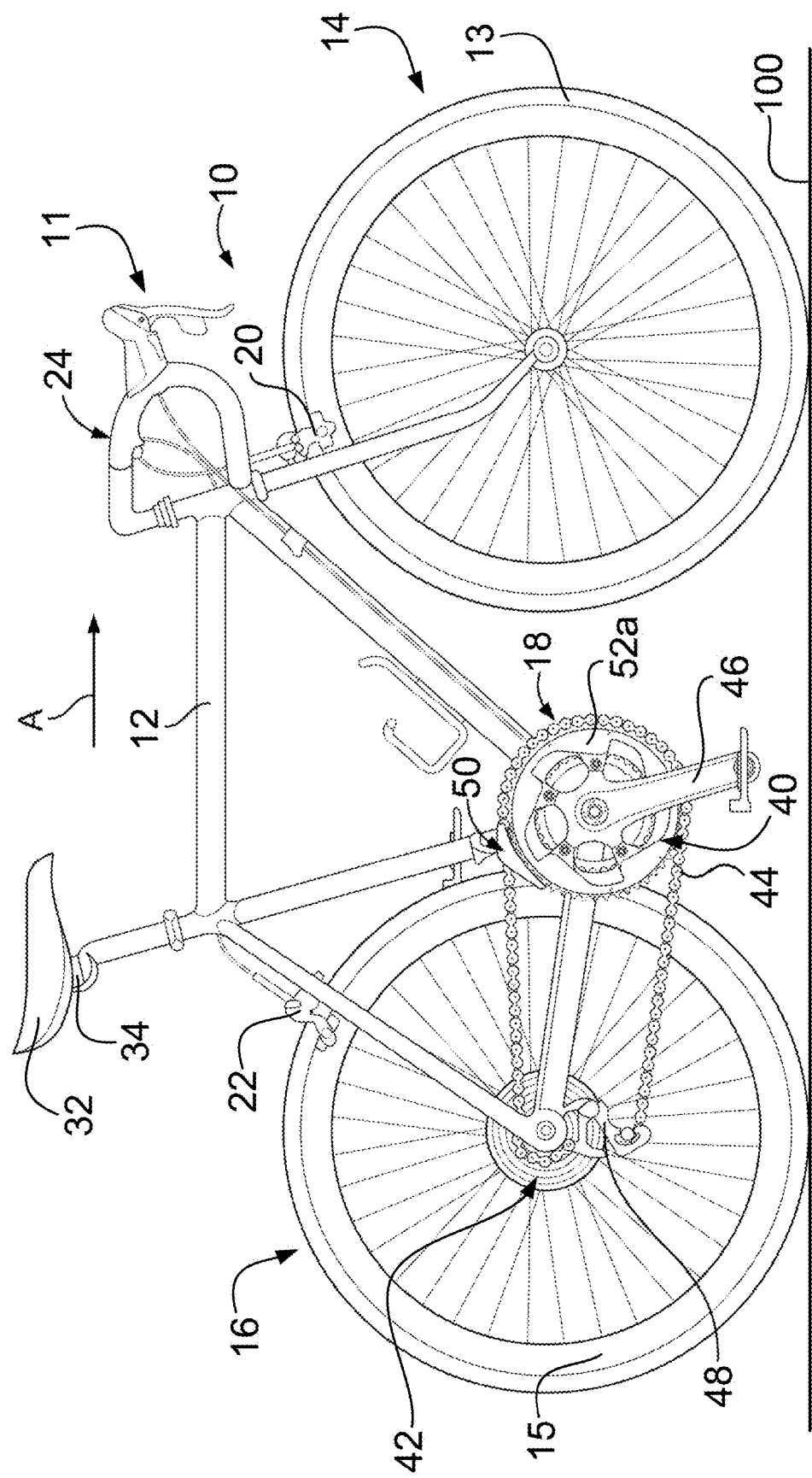
FIG. 1 is a side view of a road-type bicycle implementing an electromechanical control system.

Wireless systems may be tuned to balance high communication performance with low power consumption. Latencies or uncertainty of reception in wireless control systems may reduce the efficiency of multi-step and/or multi-component operations. For example, a signal sent from a transmitter to operate multiple wireless components may be received at different times by different components, and some components may not receive the signal at all. Such a situation may lead to unpredictable results. For example, a signal transmission to operate two components may fail in at least three ways: reception by the first component but not the second component, reception by the second component but not the first component, and no reception by either the first or second components.

Operations of an electromechanical drivetrain may be grouped in such a way that a predictable default mode is beneficial. For example, one such operation of an electromechanical drivetrain may be a recovery shift, when a front gear changer is controlled to effect a relatively large increase in drive ratio while a rear gear changer is controlled to effect a relatively small decrease in drive ratio. The intended result of this operation is to increase the drive ratio by a relatively small amount when compared with operation of the front gear changer alone. Additional considerations may affect wireless drivetrains. If a signal is transmitted to the front and rear gear changers to perform this operation then failed wireless communication could mean an opposite result where the drive ratio is decreased. For example, if the rear gear changer receives the signal but the front gear changer does not, then the rider will be presented with a downshift when he or she expects an upshift. The wireless drivetrain may be configured to avoid such an opposite result default mode.

A recovery shift may be defined as an inboard shift with one of two gear changers and an outboard shift with the other. A recovery shift may also be defined as an upshift to a higher gear ratio with one of two gear changers and a downshift to a lower gear ratio with the other.

Shifting operations may be controlled relative to locations, or chain and/or gear changer positions relative to front and/or rear sprocket assemblies, which may be chainring and cassette assemblies, respectively. For example, certain shifting operations may be blocked at extreme inboard and/or extreme outboard positions of the chain on at least one of the sprocket assemblies. In an embodiment, certain innermost/outermost and/or largest/smallest radius sprockets of the rear sprocket assembly may correspond to protected positions to which shifts cannot be made in certain scenarios. For example, a rear shift may be prevented if the gear changer is disposed axially in line with one of a set of three smallest radius rear sprockets.

In an embodiment, a wireless drivetrain may be configured with at least one component that operates as a wireless transmitter and a wireless receiver. For example, a gear changer may operate as a receiver for signals transmitted by a control unit and may also operate as a transmitter for signals intended for another gear changer. In this example, an opposite result default mode may be avoided. For example, the front gear changer may be configured to receive a front upshift signal, perform a shift operation, and transmit a downshift signal intended for the rear gear changer. In this example, the result of a signal non-reception will be either no shift for a non-reception event at the front gear changer or a larger upshift than commanded for a non-reception event at the rear gear changer. Thus, the opposite result default mode may be avoided.

A wireless drivetrain including at least one component configured to transmit and receive signals may be further optimized to increase performance. For example, multiple shifts may be timed relative to one another. In an embodiment, user inputs commanding temporally overlapping front and rear shifts, for example recovery shifts where one gear changer performs and upshift and the other gear changer performs a downshift, may be manipulated to align and/or otherwise control the timing of these shifts. For example, if a front shift requires more time to perform than a rear shift, the wireless drivetrain can be configured to delay the rear shift by a period of time. This period or length of time may be known as a delay duration. This period of time may be controlled directly by a processor, may be the result of latencies in wireless transmission between components, or combinations thereof. For example, a rear shift may be delayed by the period of time between reception of a first signal, second signal, and/or third signal by the front gear changer and the reception of a third signal and/or a fourth signal by the rear gear changer. The rear shift may be further delayed, for example by a pause time between the front gear changer receiving the third signal and the front gear changer transmitting the fourth signal.

A wireless drivetrain may also be configured to shift through a predetermined shift path. For example, a predetermined shift path may include a plurality of gear combinations defined by selection from first and second gear sets. In an embodiment, the first gear set includes two sprockets and the second gear set includes more than two sprockets. The predetermined shift path may be a pattern of moving a chain between combinations of these sprockets and may change depending on certain conditions and/or events. For example, the predetermined shift path may effect a first shift on the first gear set corresponding to different sprockets on the second gear set depending on whether the user is shifting up (to a larger effective gear ratio) or down (to a smaller effective gear ratio) through the path. Other factors such as cadence, power output, bicycle inclination, suspension position, and/or speed may be used to determine a shift path.

FIG. 1 generally illustrates a bicycle 10 of a road-type configuration with which a wireless control system may be used. The bicycle 10 includes a frame 12, front and rear wheels 14, 16 rotatably attached to the frame 12, and a drivetrain 18. A front brake 20 is provided for braking the front wheel 14 and a rear brake 22 is provided for braking the rear wheel 16. Each of the front and rear wheels 14, 16 includes a tire 13 attached to a rim 15, where the tire 13 is configured to engage the riding surface 100. A handlebar assembly 24 is provided for steering the front wheel 14. The direction of arrow "A" indicates a front and/or forward orientation of the bicycle 10. As such, a forward direction of movement for the bicycle 10 corresponds to the direction A.

Figure 2:
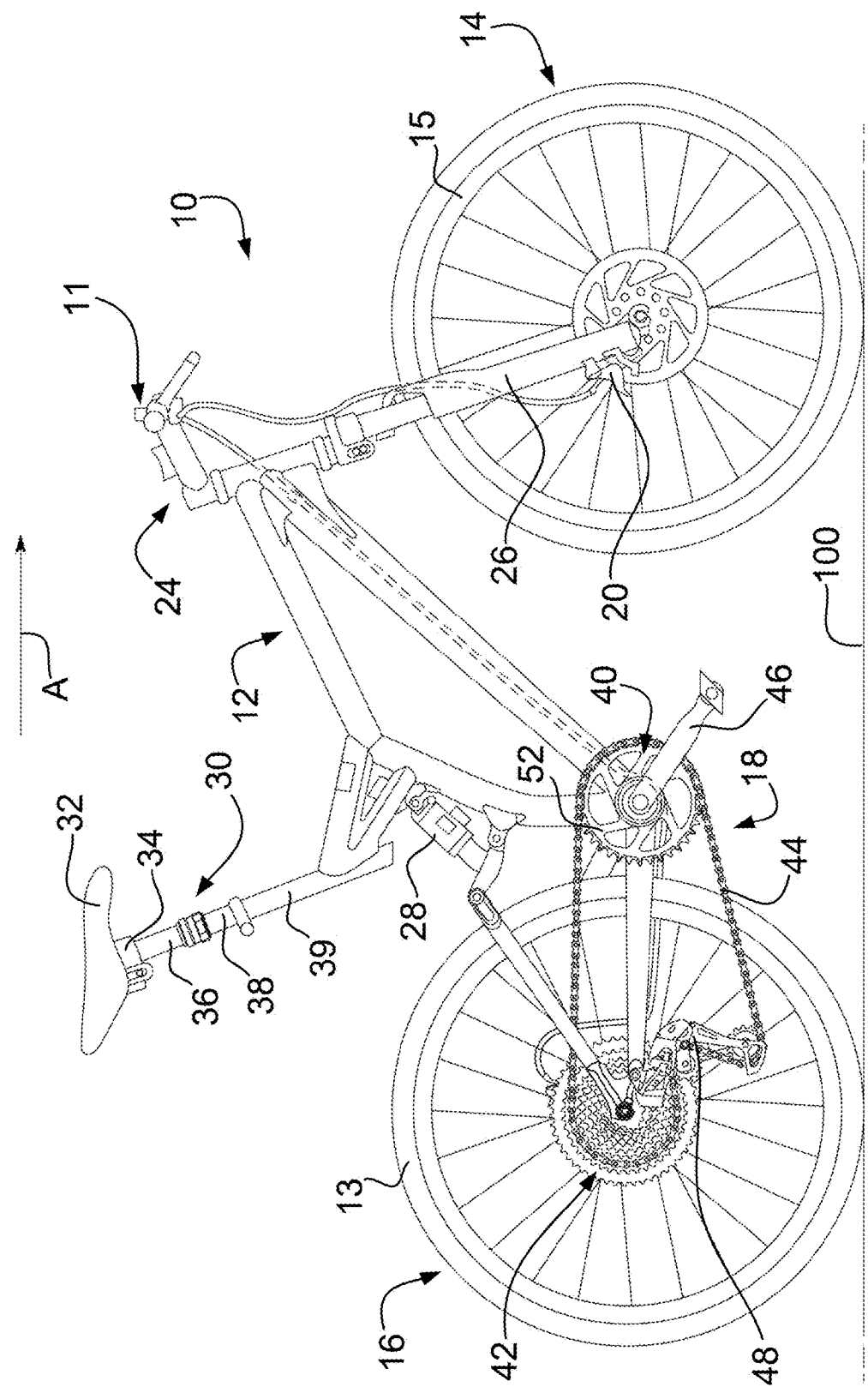
FIG. 2 is a side view of a mountain-type bicycle implementing an electromechanical control system.

Other configurations of the bicycle 10 are contemplated. For instance, FIG. 2 depicts the bicycle 10 having a mountain-type configuration. Potential differences between bicycles of various configurations include those depicted between FIG. 1 and FIG. 2. For example, FIG. 1 depicts the handlebar assembly 24 in a drop-type configuration, whereas the example in FIG. 2 has a flat-type configuration of the handlebar assembly 24. The example in FIG. 2 also includes a front suspension 26 for movably mounting the front wheel 14 to the frame 12 and a rear suspension 28 for movably mounting the rear wheel 16 to the frame 12. The front and rear suspensions 26, 28 may include one or more of an adjustable suspension component such as a spring or damper. An adjustable seating component 30 is also shown in this example configured to movably attach a saddle 32 to the frame 12. The adjustable seating component 30 may include a seat post head 34 attachable to the saddle 32 and connected to a seat post upper 36. The seat post upper 36, the seat post head 34, and the saddle 32 may be configured to move relative to a seat post lower 38 fixably attached to the frame 12. For instance, the seat post upper 36 may ride within the seat post lower 38, where the seat post lower 38 is fixed to a seat tube 39 of the frame 12.

Figure 4:
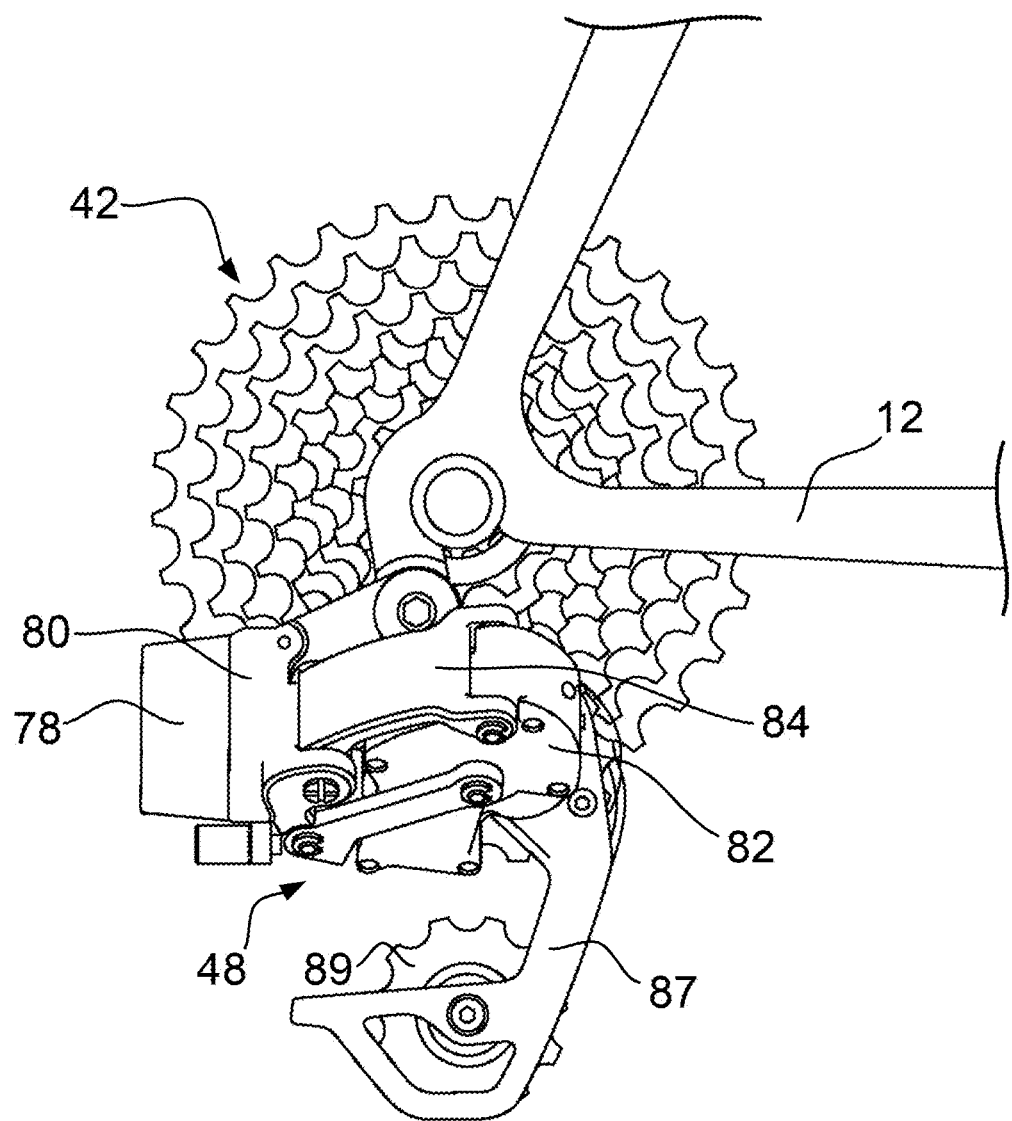
FIG. 4 is a side view of an embodiment of a rear gear changer attached to a bicycle.
Figure 5:
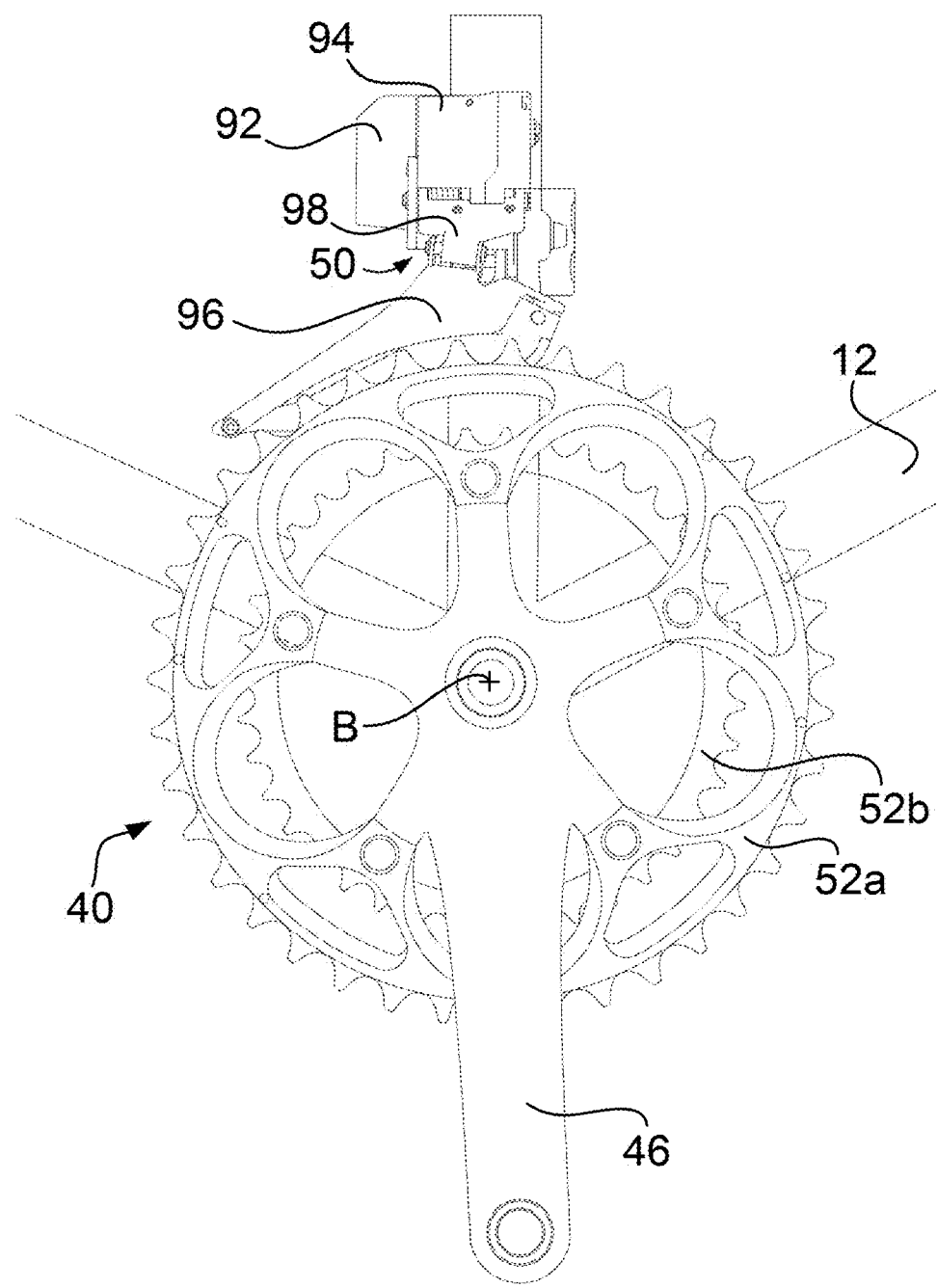
FIG. 5 is a side view of an embodiment of a front gear changer attached to a bicycle.

FIGS. 1 and 2 each depict an embodiment of the drivetrain 18 including a chainring assembly 40 rotatably mounted to the frame 12, a sprocket assembly 42 mounted to the rear wheel 16, and a chain 44 engaging the chainring assembly 40 and the sprocket assembly 42, which may be a rear sprocket assembly. The chainring assembly 40 may be attached to a crank arm 46 to facilitate torque transfer from a rider to the rear wheel 16 through the chainring assembly 40, to the chain 44, and to the sprocket assembly 42. The chain 44 may be shifted through a plurality of sprockets of the sprocket assembly 42 with a rear gear changer 48 as depicted in FIG. 4. The plurality of sprockets of the sprocket assembly 42 may be arranged by radius, for example each further outboard sprocket having a smaller radius than the last. The chain 44 may also be shifted through a plurality of chainrings of the chainring assembly 40 with a front gear changer 50 as depicted in FIG. 5. The plurality of chainrings of the chainring assembly 40 may be arranged by radius, for example each further outboard chainring having a larger radius than the last. Alternatively, as in FIG. 2, the front gear changer 50 may be omitted as when the chainring assembly 40 consists of one of a chainring 52.

Figure 3A:
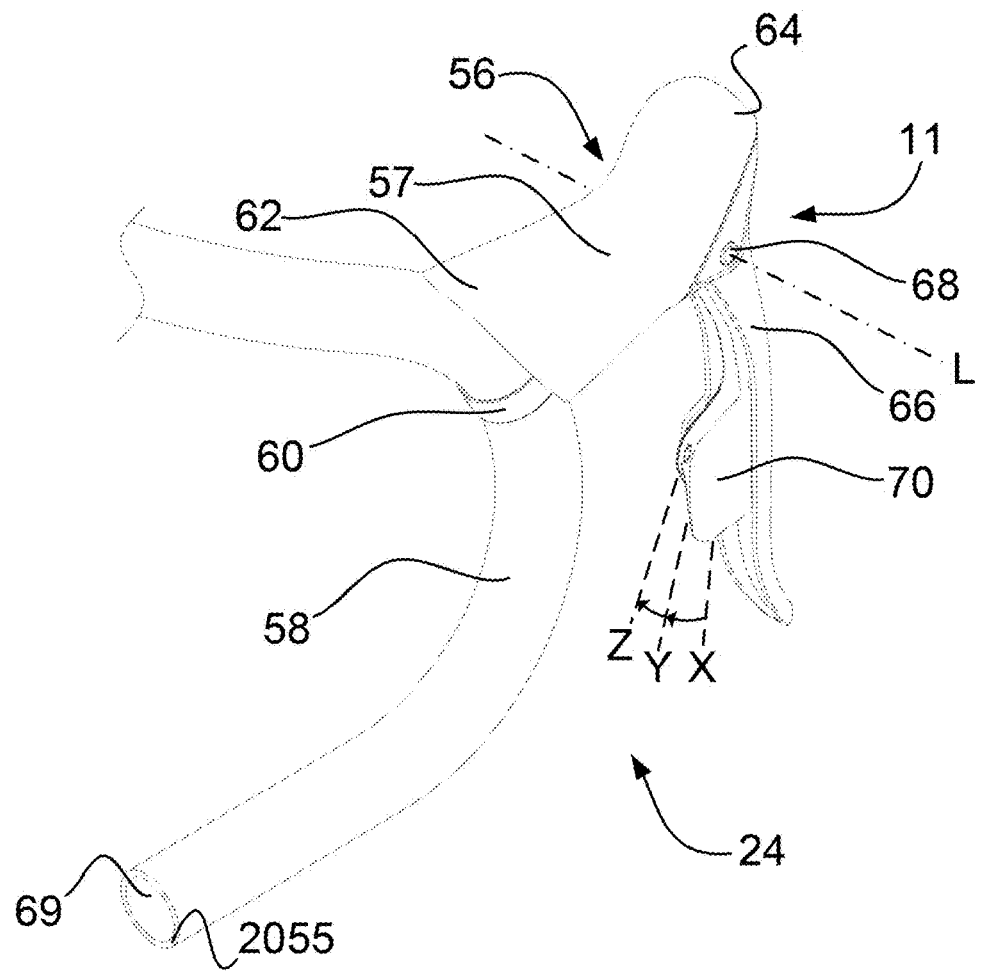
FIG. 3A is an isometric view of an embodiment of a control assembly attached to a drop style handlebar conventionally used on road-type bicycles.
Figure 3B:
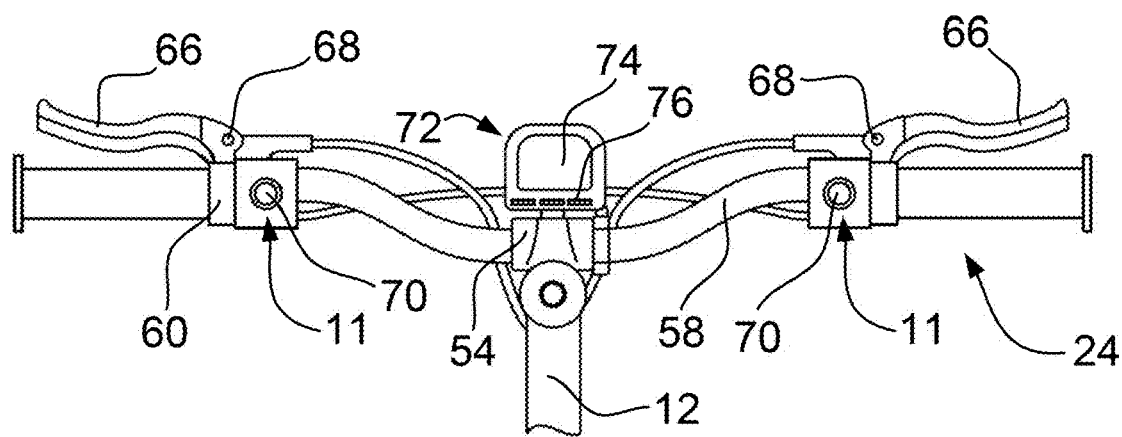
FIG. 3B is a top view of an embodiment of a pair of control assemblies attached to a flat style handlebar conventionally used on mountain-type bicycles.

Each of FIGS. 1 and 2 depict an embodiment of a control assembly 11 for controlling components of the bicycle. FIG. 3A further depicts an embodiment of a road-type configuration of the control assembly 11 as in FIG. 1. FIG. 3B further depicts an embodiment of a mountain-type configuration of the control assembly 11 as in FIG. 2. The control assembly 11 may be a plurality of control assemblies. For example, a pair of control assemblies 11 may be used. Other embodiments of the control assembly 11 are contemplated, for instance in a triathlon or time trial application where a first pair of control assemblies 11 may be used on extensions (e.g. handlebar extension 2063 of FIG. 15A) of the handlebar assembly 24 and a second pair of control assemblies may be used adjacent the brake levers 66. Additionally, the embodiments shown may be employed on various configurations of the bicycle 10. For example, the control assembly 11 of FIG. 3B may be employed on the handlebar assembly 24 of FIG. 3A. The control assembly 11 may also be mounted elsewhere on the bicycle 10. For example, an embodiment of the control assembly 11 may be mounted to a stem 54, where the stem 54 is configured to attach the handlebar 58 to the frame 12.

The embodiment of FIG. 3A includes a control assembly 11 having a hood portion 56 mounted to a handlebar 58 with an attachment member 60 connected to a first end 62 of the hood portion 56. The attachment member 60 may be a clamp as shown or may be otherwise attachable, for instance through threaded engagement with the handlebar 58. The hood portion 56 includes a second end 64 attached to the brake lever 66. The hood portion 56 is configured to support rider hand placement forward of the handlebar 58 between the first and second ends 62, 64. The hood portion 56 may have a hood cover 57 configured to facilitate gripping of the hood portion 56 by the rider. The hood cover 57 may be elastomeric and/or removable for service. The brake lever 66 may be pivotable about a lever axis L. For example, a lever pivot 68 may pivotably connect the brake lever 66 to the hood portion 56. The control assembly 11 is shown to further include a switch device 70. The switch device 70 may be a button, lever, or other implement controllable by a rider. The switch device 70 may be a plurality of controls. For example, two of the switch device 70 may be used on one of the control assemblies 11.

The switch device 70 depicted in FIG. 3A is pivotable about the lever axis L and rotatably fixed with the brake lever 66 about lever axis L. The switch device 70 may be configured to be a component of the brake lever 66 or may alternatively be distinct or disconnected from the brake lever 66. For instance, the switch device 70 may be pivotable about the lever axis L independently from the brake lever 66. The switch device 70 may be movable into a plurality of positions. For example, the switch device 70 may have a rest position X, a first actuation position Y, and a second actuation position Z. The rest position X may be referred to as a first position, the first actuation position Y may be referred to as a second position, and the second actuation position Z may be referred to as a third position. Each of the positions X, Y, and Z of the switch device 70 may correspond to an axial movement of the switch device 70 of different distances along the lever axis L or alternatively a rotational movement through an arc about a point defined on the lever axis L. For example, a first distance may be defined between positions X and Y and a second distance may be defined between positions X and Z. A path may describe the movement of the switch device as in FIG. 3A. For example, the positions X, Y, and Z may be defined along the path between positions X and Z. The brake lever 66 may move with the switch device 70 or else the switch device 70 may move relative to the brake lever 66. In an embodiment, one of the actuation positions Y, Z may be omitted. For example, the switch device 70 may toggle between the rest position X and the actuation position Y.

FIG. 3B depicts a top view of an embodiment of a mountain-type configuration of the handlebar assembly 24. The embodiment in FIG. 3B includes a user device 72 disposed between two of the switch device 70. The user device 72 may be configured to communicate electronically with at least one of the switch devices 70. The user device 72 is shown connected to the handlebar 58 but may be connected to other components of the bicycle 10, such as the stem 54 or the frame 12. Alternatively, the user device 72 may be removed from the bicycle 10, for instance as a worn or carried device.

Circuitry of the control assembly 11 configured to transmit and/or receive signals may be integrated with the switch device, or may be remotely located, such as in the user device 72. The user device 72 may be employed to consolidate components of a plurality of the control assembly 11. For example, the user device 72 may have circuitry that includes transmission and/or reception components that may be included on the control assembly 11 in other embodiments. The user device 72 may also include a control user interface 74. The control user interface 74 may be a display and may be configured to represent status of components and/or may include an interface to control or adjust components. For instance, the control user interface 74 may be a touch screen. Alternatively or additionally, the user device 72 may include one or more of a user device button 76 to control or adjust components.

The example in FIG. 3B depicts two embodiments each of the control assembly 11 and the attachment member 60 disposed on opposite sides the handlebar 58. The control assembly 11 may be attached to the handlebar 58 with the attachment member 60 or may be otherwise attached. For example, the control assembly 11 may be attached to the handlebar 58 independently of the brake lever 66. Each embodiment of the control assembly 11 is shown to have a single embodiment of the switch device 70. An embodiment of the wireless control system may include more than one of the switch devices 70 on one or more of the control assemblies 11. For example, one of the control assemblies 11 may include two of the switch devices 70 arranged in opposition as on a rocker switch and the other of the control assembly 11 may include a single embodiment of the switch device 70.

Figure 6:
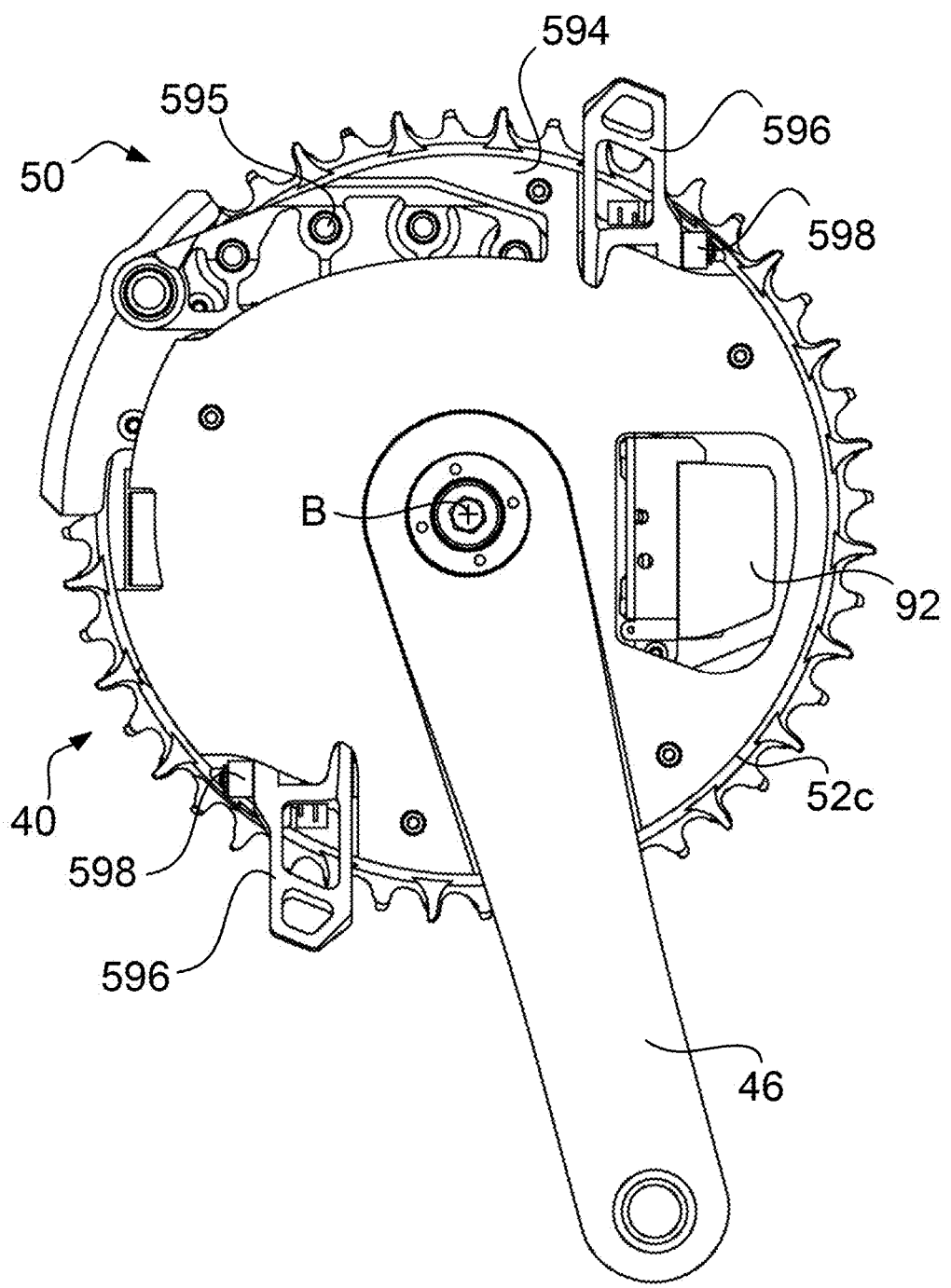
FIG. 6 is a side view of an embodiment of a front gear changer attached to a crank assembly.

The control assembly 11 may include wireless communication components to control other components of the bicycle 10. For example, the control assembly 11 may include a control communication device 71, as shown in FIG. 6, configured to transmit operation signals responsive to actuation of the switch device 70. The control communication device 71 may be further configured to send signals responsive to actuation of the switch device 70. The control communication device may be configured to send signals responsive to the actuation position Y. In one example, actuation of the switch device 70 to the actuation position Y may trigger sending operation signals from the control communication device 71.

The control communication device 71 may also be configured to respond to various signals. For example, a control processor 110 may be configured to generate signals in response to actuation of the switch device 70. In an embodiment, the control processor 110 generates a signal configured to change a mode of the control communication device 71. The control processor 110 may generate an anticipation signal responsive to the first actuation position Y configured to change the control communication device 71 to a ready mode. The anticipation signal may be configured to wake up, turn on, or transition the control communication device 71 to a higher power use state. The control processor 110 may also generate a control signal configured to trigger the control communication device 71 to transmit a signal. The control processor 110 may enter a transmit mode upon triggering to transmit a signal. The control communication device 71 may be responsive to transmit the operation signal to control a component of the bicycle 10.

Different embodiments of the control communication device 71 may be configured to transmit different signals. For example, the signals from a first embodiment of the control communication device 71 may include a first device ID and a second embodiment of the control communication device 71 may include a second device ID. The first and second device IDs may be used to effect different actions in various components upon reception by such components. For example, a signal carrying a first device ID may correspond with a derailleur outboard shift whereas a signal carrying a second device ID may correspond with a derailleur inboard shift.

One signal may trigger various operations of one or more component of the bicycle 10. For example, the control processor 110 may generate a signal responsive to the actuation position Y, the signal being configured to change the mode of the control communication device 71 to the ready mode and to trigger the control communication device 71 to transmit the operation signal. The operation signal may then trigger one or more components such as the front gear changer 50 and/or the rear gear changer 48 to operate and/or listen for an extended period of time. For example, the operation signal may be configured to control an upshift or a downshift of the front and/or rear gear changers 50, 48.

Other components of the bicycle 10 may be configured to transmit further signals responsive to receiving one or more signals from the control communication device 71. For example, the rear gear changer 48 and/or the front gear changer 50 may be configured to transmit a signal responsive to receiving a signal from the control communication device 71. In an embodiment, the front gear changer 50 is configured to transmit a rear shift signal responsive to receiving a front shift signal from the control communication device 71.

Components may be further configured to transmit signals responsive to receiving signals in combination with one or more conditions. For example, the front gear changer 50 may be configured to transmit a rear shift inboard shift signal responsive to receiving a front outboard shift signal from the control communication device 71. A front shift signal may be a front inboard shift signal because of the device type and/or device ID of the transmitting device. For example, an embodiment of the control processor 110 may be configured to generate signals carrying a consistent device type and/or device ID signifier.

Referring now to FIG. 4, various embodiments of the device may include the rear gear changer 48, shown to control movement of the chain 44 between sprockets of the sprocket assembly 42. The rear gear changer 48 depicted in FIG. 4 includes a rear power source 78. The rear power source 78 may be a battery, which may be rechargeable. The rear power source 78 is shown attached to a rear base member 80 of the rear gear changer 48 but may be located on another part or parts of the rear gear changer 48 or on the frame 12. The rear base member 80 attaches to the frame 12 and is connected to a rear movable member 82 of the rear gear changer 48 by a rear linkage 84 of the rear gear changer 48. The rear movable member 82 is configured to move relative to the rear base member 80 responsive to force as may be supplied by a rear motor or servo.

The rear motor may be included with the rear gear changer 48 to supply force to move the rear movable member 82. A rear processor may be included to control the rear motor to execute shifts up or down the sprocket assembly 42. The rear processor may be responsive to signals generated by the control assembly 11. For example, the control communication device 71 of the control assembly 11 may wirelessly communicate with a rear communication device associated with the rear processor. The rear communication device may be a radio or any other device configured to communicate with the control communication device 71. In an embodiment, communication between the rear communication device and the control communication device may be wireless.

The rear gear changer 48 may also be configured to control tension of the chain 44. For example, the rear gear changer 48 may have a tension device 87 configured to interact with the chain 44. In an embodiment, the tension device 87 includes a tension pulley 89 configured to mesh with the chain 44. Movement of the tension pulley 89 may control the tension of the chain 44. For example, the tension pulley 89 may relative to the rear movable member 82 to maintain consistent tension on the chain 44 as it is moved to relatively smaller sprockets of the drivetrain, thus decreasing chain wrap or to relatively larger sprockets of the drivetrain, thus increasing chain wrap.

The tension device 87 may be sprung to maintain tension on the chain 44. In an embodiment, the tension device 87 includes a spring (not shown) and a damper (not shown) configured to control tension on the chain 44. The damper may be configured unidirectionally. For example, the damper may control movement of the tension pulley 89 in a detensioning direction. The damper may not control or control to a lesser degree movement of the tension pulley 89 in an opposite tensioning direction. The tensioning and opposite detensioning directions may be rotational directions about an axis between the rear movable member 82 and the tension device 87.

Referring now to FIG. 5, various embodiments of the device may include the front gear changer 50 shown, to control movement of the chain 44 between the chainrings 52a, 52b of the chainring assembly 40. The front gear changer 50 depicted in FIG. 5 includes a front power source 92. Alternatively, the front gear changer 50 may use a common power source. For example, the front gear changer 50 and the rear gear changer 48 may have a wired connection therebetween such that the front and rear gear changers 50, 48 draw power from the rear power source 78, the front power source 92, or a central power source (not shown).

The front gear changer 50 includes a front base member 94 fixed in an axial direction relative to the frame 12 and a front movable member 96 movably connected to the front base member 94 by a front linkage 98. The front power source 92 may supply power to a front motor. The front motor is configured to apply torque to components of the front gear changer 50 to move the front movable member 96 relative to the front base member 94. In such a way, the front gear changer 50 may shift the chain 44 between the chainrings 52a, 52b of the chainring assembly 40.

The chainring assembly 40 shown includes a first chainring 52a and a second chainring 52b. A different number of chainrings may be employed. For example, three chainrings may be employed. Alternatively, a single of the chainring 52 may be employed, in which case the front gear changer 50 may be omitted, as shown in FIG. 2.

A front processor may be included to control the front motor to execute shifts up or down the chainring assembly 40. The front processor may be responsive to the control assembly 11. For example, the control communication device 71 of the control assembly 11 may wirelessly communicate with a front communication device associated with the front processor. The front communication device may also be configured to wirelessly communicate with the rear communication device associated with the rear processor. For example, the rear communication device may send signals received by the front communication device. In this example, the front communication device may increase listening activity responsive to receiving signals from the rear communication device. The front communication device may also send signals to be received by the rear communication device. The front communication device may be a radio or another device configured to communicate with the control communication device 71.

FIG. 6 depicts another embodiment of a front gear changer 50. The embodiment of FIG. 6 differs from previous embodiments in that the front gear changer 50 is mounted to the chainring assembly 40. This mounting arrangement may simplify design of the frame 12, as no specific mounting facility for the front gear changer 50 need be provided. The front gear changer 50 of FIG. 6 includes the front power source 92. The front power source 92 may be configured to provide power for wireless transmission, reception, and/or operation of the front gear changer 50.

The front gear changer 50 may include a first front base member 594 connected to the chainring assembly 40 and may also include a second front base member 598 connected to the chainring assembly 40. The first and second front base members 594, 598 may be separate or may comprise a single base member unit. A first front movable member 595 may be movably connected to the first front base member 594. The first front movable member 595 may include one or more chain guidance features configured to move the chain 44 from the second chainring 52d to the first chainring 52c. A second front movable member 596 may be movably connected to the second front base member 598. The second front movable member 596 may include one or more chain interference features configured to move the chain 44 from the first chainring 52c to the second chainring 52d.

Figure 7:
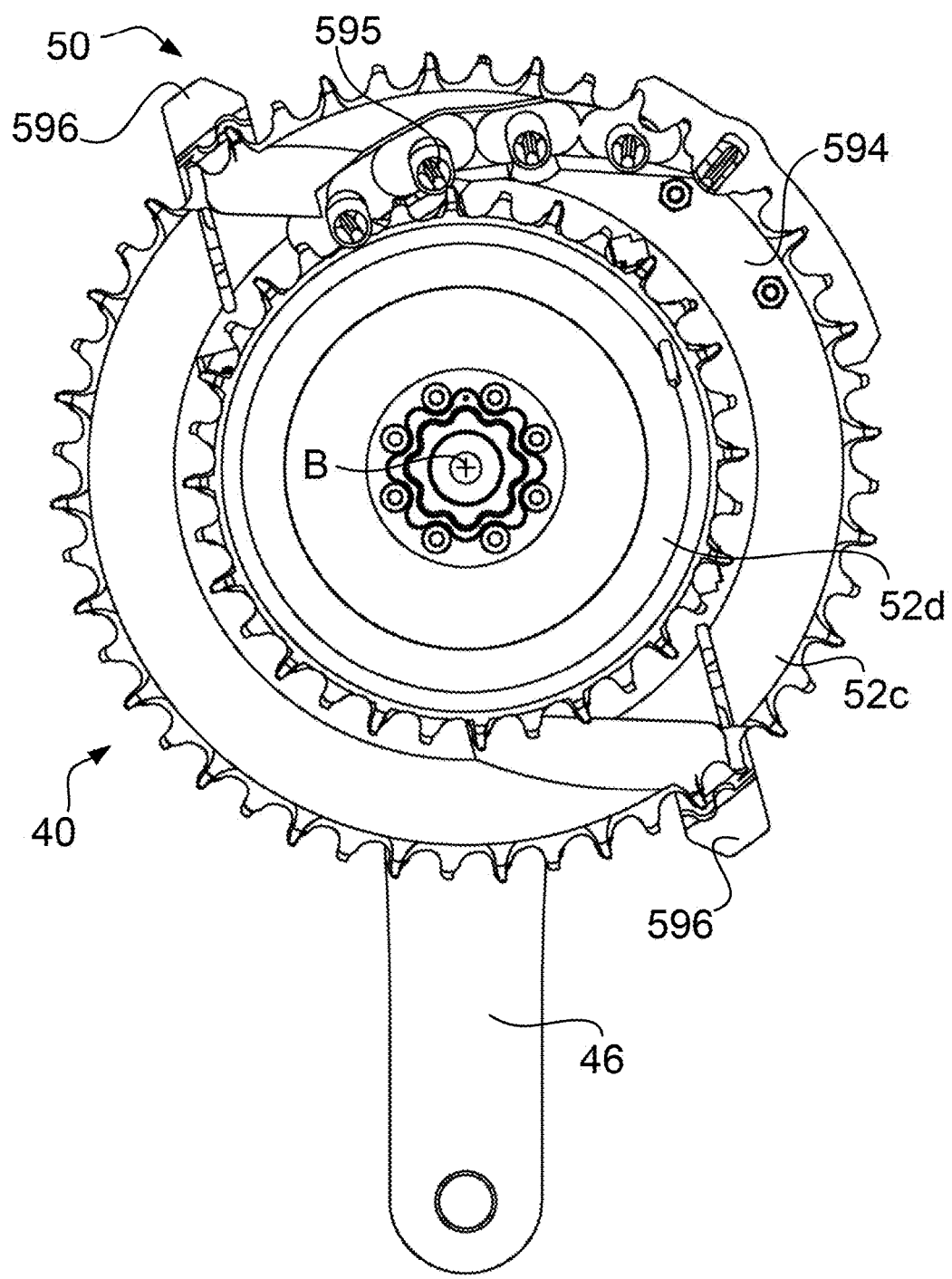
FIG. 7 is an opposing side view of the front gear changer of FIG. 6.

FIG. 7 depicts the opposite side of the front gear changer 50 of FIG. 6. The front gear changer 50 may include a plurality of first and second front movable members 595, 596. For example, two of the second front movable member 596 may be provided while one of the first movable member 595 is provided. Similar to other embodiments, control of the movable members 595, 596 may be effected by wireless control, which may include a wireless transmitter, a wireless receiver, motor, and/or a processor disposed on the front gear changer 50. A front linkage (not shown) may be provided to connect components to a common operating device. For example, the front linkage may connect the first and second front movable members 595, 596 to a common front motor.

Figure 8:
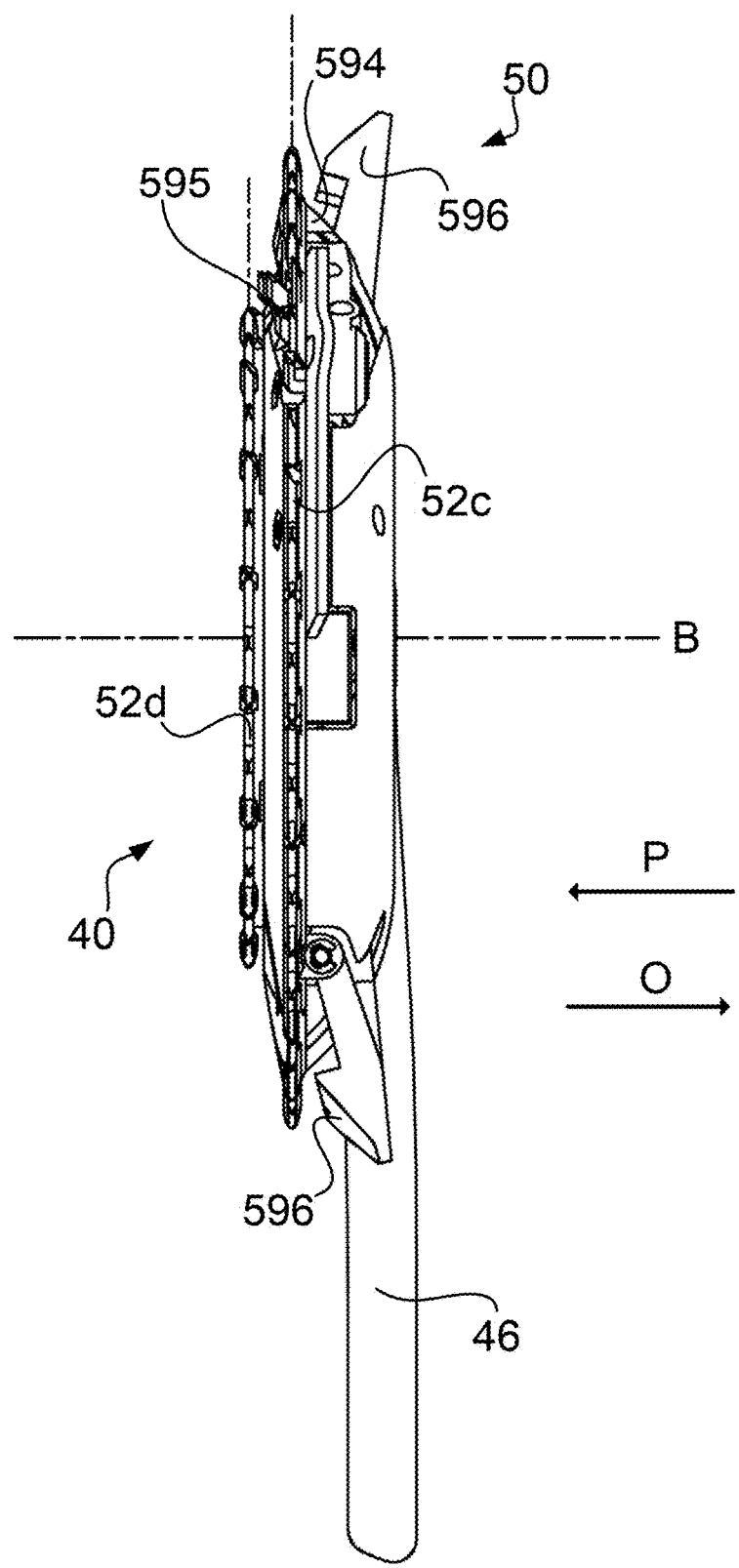
FIG. 8 is an end view of the front gear changer of FIG. 6.

FIG. 8 is an end view of the front gear changer 50 of FIG. 6. The front gear changer 50 is shown to rotate about a crank axis B. The crank axis B is also the axis of rotation for the chainring assembly 40. An outboard direction θ and an inboard direction P are shown as opposing directions relative to the crank axis B. The front gear changer 50 may have components disposed axially between the chainrings 52*c*, 52*d*. For example, the first movable member 595 may be movable within the axial distance between the chainrings 52*c*, 52*d*. The front gear changer 50 may have components disposed axially outboard of the first chainring 52*c*. For example, the second movable member 596 may be movable from axially outboard of the first chainring 52*c* to axially between the first and second chainrings 52*c*, 52*d* during a downshifting movement.

Figure 9:
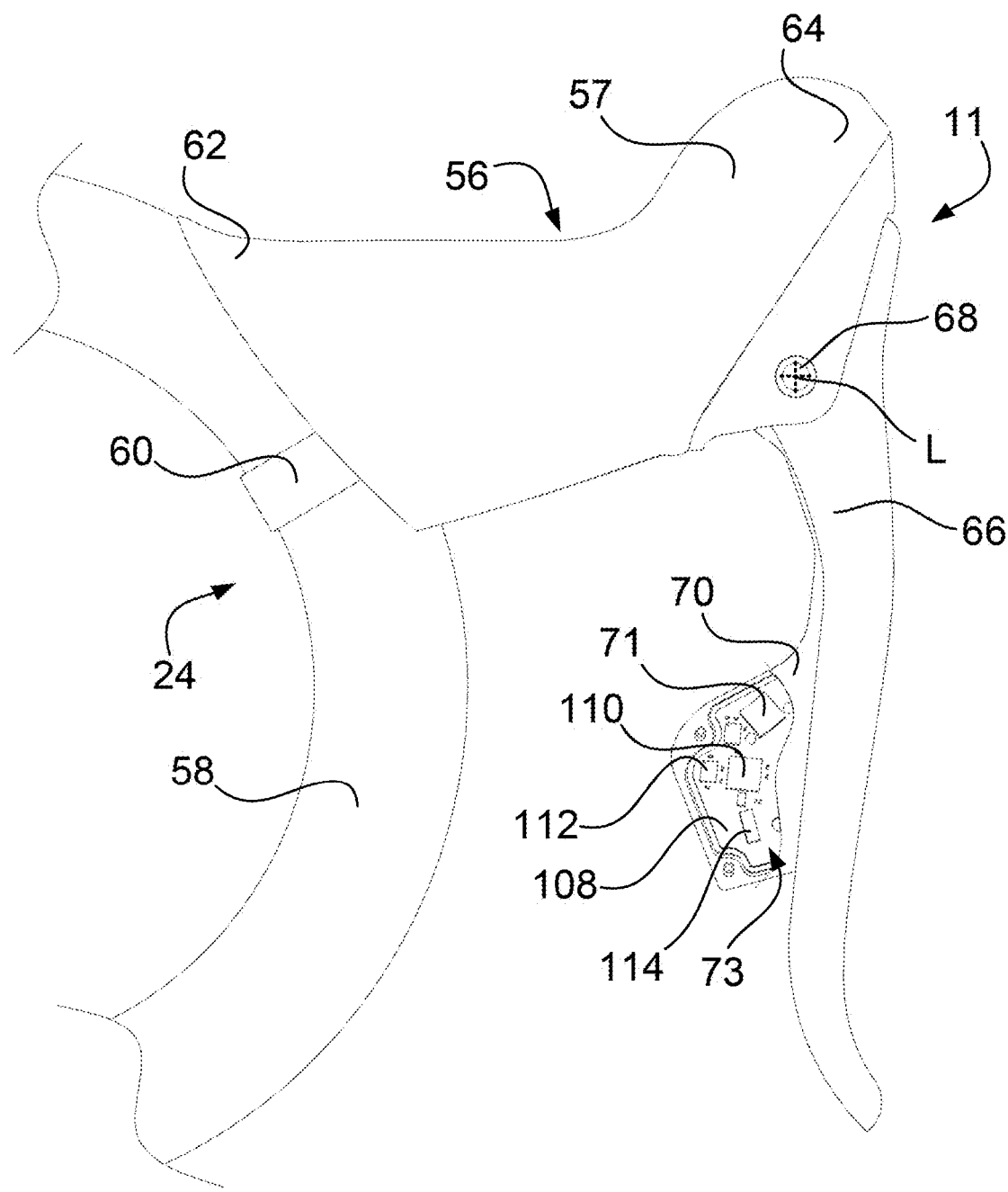
FIG. 9 is a partial sectional view of an embodiment of a control assembly.

FIG. 9 shows a partial cutaway view of the control assembly 11 as mounted to the handlebar 58. The switch device 70 is shown in partial cutaway such that a control unit 108 can be seen. The switch device 70 may include a control compartment 73 configured to house the control unit 108. The control compartment 73 may be sealed from environmental factors to protect components of the control unit 108. In an embodiment, the control compartment configured to allow the passage of radio frequency signals. For example the control compartment may be constructed substantially from radio frequency transparent materials.

The control unit 108 is shown to include the control communication device 71 and the control processor 110. The control unit 108 may include a printed circuit board ("PCB") having circuitry for interpreting actions, generating signals, and/or transmitting signals. Alternatively, the control unit 108 may be omitted and components associated therewith may be otherwise connected. For example, flexible connectors such as wires may be used.

The control unit 108 is shown in a PCB configuration. The shown PCB embodiment of the control unit 108 has a substrate to which components of the control unit 108 are applied and/or attached. The substrate may form the structure and/or shape of the control unit 108. The substrate may be any substance operable to form the underlying attachment of the components of the control unit 108, such as a dielectric composite material. For example, composites such as phenolic cotton paper (e.g. FR-2), cotton paper and epoxy (e.g. FR-3), glass-reinforced epoxy (e.g. FR-4, FR-5, FR-6), and/or other materials as well as combinations thereof, may be used. The substrate may be rigid or flexible.

Connection of circuitry to the control unit 108 may be accomplished using various techniques. In an embodiment, connection is accomplished through application of a layer of an electrically conductive medium, such as solder, between electrical contact connection surfaces of the control unit 108. Such connection may provide electrically communicative contact between electronic components connected to the control unit, such as the control communication device 71 and the control processor 110.

The control unit 108 may be configured to resist an actuation force. For example, the control unit 108 may be sized and shaped to fit closely within an opening of the switch device 70 so as to reduce movement therein. The control unit 108 may be further sized and shaped to resist deformation or displacement within the switch device 70 when a force is applied to the control unit 108. The control unit 108 may also be adhesively mounted and/or secured with fasteners.

The control unit 108 includes the control processor 110 and a control memory 112. The control processor 110 may include a general processor, a digital signal processor, an application specific integrated circuit ("ASIC"), a field programmable gate array ("FPGA"), an analog circuit, a digital circuit, combinations thereof, or other now known or later developed processor. The control processor 110 may be a single device or a combination of devices, such as through shared or parallel processing.

The control memory 112 may be a volatile memory or a non-volatile memory. The control memory 112 may include one or more of a read only memory ("ROM"), a random access memory ("RAM"), a flash memory, an electronic erasable program read only memory ("EEPROM"), or another type of memory. The control memory 112 may be removable from the control unit 108, such as in a secure digital ("SD") memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The control memory 112 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, methods described herein may be implemented with software programs executable by a computer system, such as the control unit 108, the rear gear changer 48, and/or the front gear changer 50. Further, in an exemplary, non-limited embodiment, implementations can include distributed processing, component/object distributed processing, and parallel processing. Alternatively, virtual computer system processing can be constructed to implement one or more of the methods or functionality as described herein.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry (e.g., an FPGA or an ASIC).

As used in this application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware, as well as other electronic components. The term "circuitry" would also cover, for example and if applicable to the particular claim element, a baseband integrated circuit or applications processor integrated circuit for a mobile computing device or a similar integrated circuit in server, a cellular network device, or other network device.

Processors suitable for the execution of a computer program include, by way of example, both general and special purpose microprocessors, and any one or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data (e.g., magnetic, magneto optical disks, or optical disks). However, a computer need not have such devices. Moreover, a computer can be embedded in another device, for example, a mobile telephone, a personal digital assistant ("PDA"), a mobile audio player, a Global Positioning System ("GPS") receiver, a control unit 108, a rear gear changer 48, or a front gear changer 50, to name just a few. Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD-ROM and DVD-ROM disks. The processor and the memory can be supplemented by, or incorporated in, special purpose logic circuitry.

The control communication device 71 provides for data and/or signal communication from the control unit 108 to another component of the bicycle, or an external device such as a mobile phone or other computing device. The control communication device 71 may communicate data using any operable connection. An operable connection may be one in which signals, physical communications, and/or logical communications may be sent and/or received. An operable connection may include a physical interface, an electrical interface, and/or a data interface. The control communication device 71 may be configured to communicate wirelessly, and as such include one or more antennae. The control communication device 71 provides for wireless communications in any now known or later developed format.

A control antenna 114 may also be provided. The control antenna 114 may be a plurality of control antennae. As illustrated in FIG. 9, the control unit 108 includes an antenna included with the circuitry of the PCB, however additional antennae may also be included in the circuitry. The control antenna 114 may be integrated with another component of the bicycle or may be an independent component. For example the control antenna 114 may be integrated as part of the control communication device 71 and/or as part of the brake lever 66.

Figure 10:
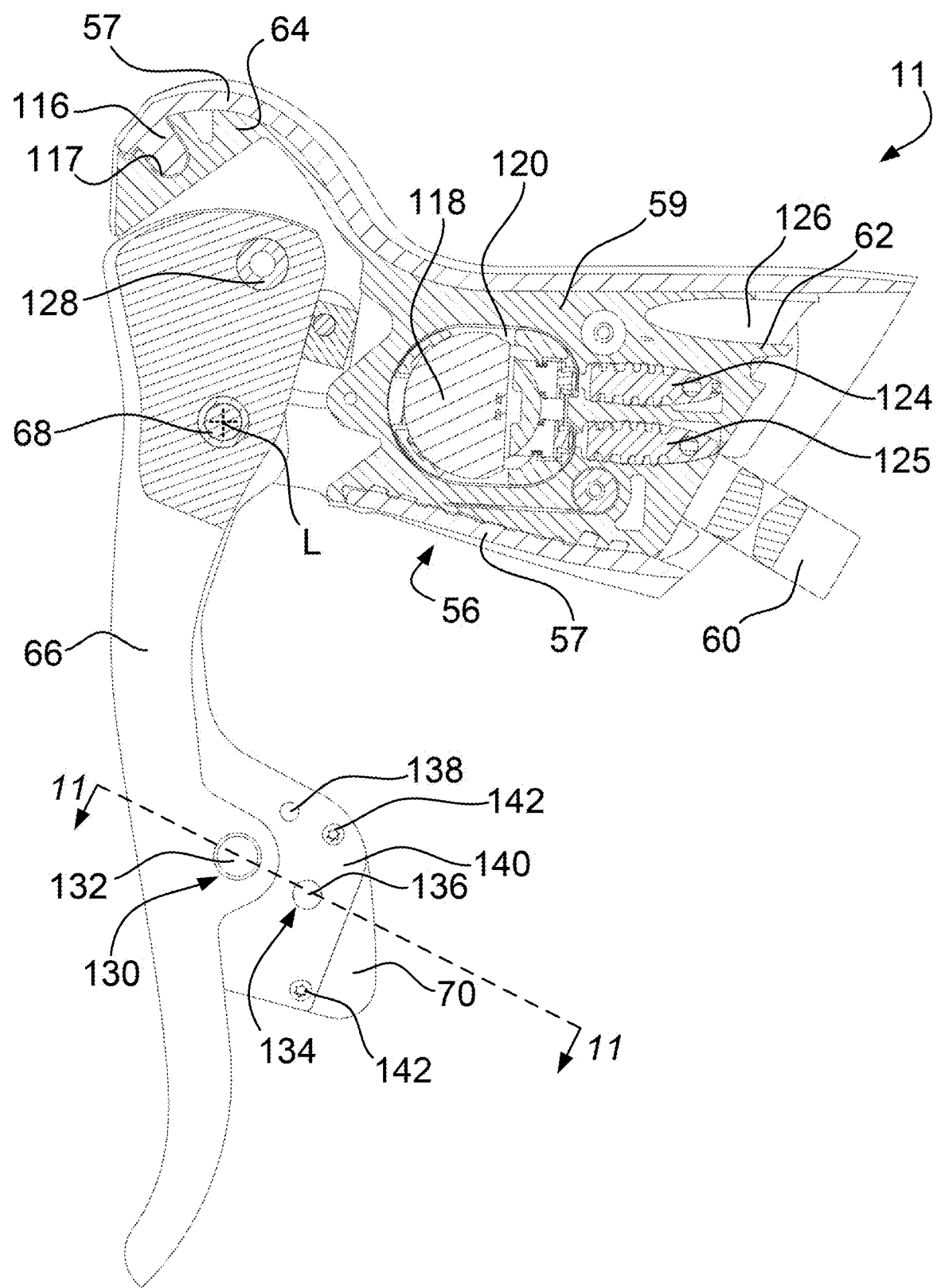
FIG. 10 is another partial sectional view of the control assembly of FIG. 9.

FIG. 10 is another partial sectional view of the control assembly 11 of FIG. 9. The view in FIG. 10 shows the control assembly 11 from the opposite side shown in FIG. 9. The hood portion 56 of the control assembly 11 is shown with the hood cover 57 encompassing a hood body 59. The hood body 59 is intended as a gripping portion, where the hood cover 57 provides contact surface for a rider's hand. The hood cover 57 may be permanently or removably attached to the hood body 59 or may be integral with the hood body 59. For example, the hood body 59 may be overmolded with the hood cover 57. In an alternative embodiment, the hood cover 57 may have one or more of a hood attachment feature 116. The hood attachment feature 116 may be used to anchor the hood cover 57 to the hood body 59. For example, the hood attachment feature 116 may interact with a cover catch 117 to anchor the hood cover 57 to the hood body 59.

The hood body 59 may be of any suitable material. For example, the hood body 59 may be of metal, plastic, and/or composite construction. The hood body 59 may be constructed to carry, house, and/or support various mechanisms. For example, the hood body 59 is shown to enclose a control power source 118.

The hood cover 57 may be made of any suitable material, such as natural and/or synthetic elastomeric materials. For example, the hood may be constructed from a thermoplastic elastomer such as Santoprene™. The hood cover 57 may be designed to present a comfortable interface for the user and to reduce the tendency to become detached or moved from its position relative to the hood body 59. The hood cover 57 may be configured to be removably attached to and held in position on the hood body 59, for instance using a plurality of the hood attachment features 116.

The control power source 118 is shown disposed in a hood compartment 120 of the hood body 59. The hood compartment 120 is sized and shaped to house the control power source 118 and optional other components, mechanisms, connectors, and the like. The control power source 118 may be a battery, such as a coin cell. The hood compartment 120 may be accessed through a hood compartment cover (not shown) which may be held in place with screws or other fasteners. In an embodiment, the hood compartment 120 is disposed on a downward facing portion of the hood body 59.

The attachment member 60 may be provided to mount the control assembly 11 to the handlebar 58. For example, the attachment member 60 may be threadably attached to the hood body 59 such that tightening the attachment member 60 closer to the hood body 59 urges the hood body 59 together with the handlebar 58.

The brake lever 66 may include one or more components of a first switch assembly 130. For example, the brake lever 66 may include a first switch lever protrusion 132. The first switch lever protrusion 132 may be attached to, formed on, or otherwise provided on the brake lever 66. The first switch lever protrusion 132 may be in the form of a post, boss, cylinder, or the like. The first switch lever protrusion 132 may interact with other components of the first switch assembly 130.

The first switch assembly 130 may be operable to generate anticipation, operation, and/or control signals. In an embodiment, the first switch assembly 130 is operable through actuation of the switch device 70. For example, operation of switch device 70 may selectively close or open one or more circuits in the first switch assembly 130. In an embodiment, the first switch assembly 130 may be configured to close a first circuit at a first actuation position and close a second circuit at a second actuation position, beyond the first actuation position. In an embodiment, the switch device 70 is configured to move in a same direction from a rest or neutral position to both the first actuation position and the second actuation position. For example, the switch device 70 is configured to rotate about and axis with the first actuation position and the second actuation position as discrete locations along the movement of the switch device 70. In another embodiment, the switch device 70 is configured to move between only two discrete positions: a rest position and an actuation position.

A mode assembly 134 may also be provided. The mode assembly 134 may be operable to generate mode signals. For example, the mode assembly 134 may include a mode actuator 136 operable to close a mode circuit. The mode actuator 136 may be a type of switch. For example, the mode actuator 136 may be a momentary switch, such as a button, or may be a toggle switch. The mode actuator 136 may alternatively operate without closing a circuit. For example, the mode actuator 136 may be operable to select an alternate state of a processor. The mode actuator 136 may be configured to be operable concurrently with the switch device 70, for example to modify signal generation responsive to actuation of the switch device 70.

Accessory connections may be provided. For example, a first accessory connection 124 and a second accessory connection 125 may be formed in the hood body 59. The first and second accessory connections 124, 125 may facilitate external accessories to be electrically connected to the control power source 118 and/or the control unit 108. One example of such an accessory is a remote electrical switch, such as a dome switch configured with a connective coupling, or jack connection, operable to couple with the accessory connections 124, 125.

A brake connection 126 may also be provided. The brake connection 126 may be configured for connecting to cable, hydraulically, and/or electronically actuated brakes. The brake lever 66 may include a brake pivot 128. The brake pivot 128 may be configured to receive a brake cable head (not shown) to pull a brake cable (not shown) to actuate the front and/or rear brake 20, 22. The brake pivot 128 may also control the actuation of a brake master cylinder (not shown) as in a hydraulic braking configuration. The brake cable (not shown) or a hydraulic hose (not shown) may be configured to pass through the brake connection 126.

In an embodiment, the control unit 108 includes an indicator regarding activity, actions, or status of the control unit 108. In an embodiment, the control unit 108 includes a visual indicator 138. For example, an LED indicator configuration of the visual indicator may be provided. In an embodiment, the visual indicator 138 lights to indicate input of commands or other actions of the control unit 108. The visual indicator 138 may be located on the bicycle 10 to facilitate indication of one or more states of a component or components of the bicycle 10 to a rider or mechanic.

The switch device 70 may include one or more of a control fastener 142 configured to connect the switch device 70 with a control cover 140. For example, four control fasteners 142 may be provided. In an embodiment, the control fasteners 142 are screws configured to pass through the control cover 140 and threadably engage the switch device 70. Also in an embodiment, the control fasteners 142 are configured to bring the switch device 70 and the control cover 140 into sealing engagement to seal the control compartment 73.

Figure 11:
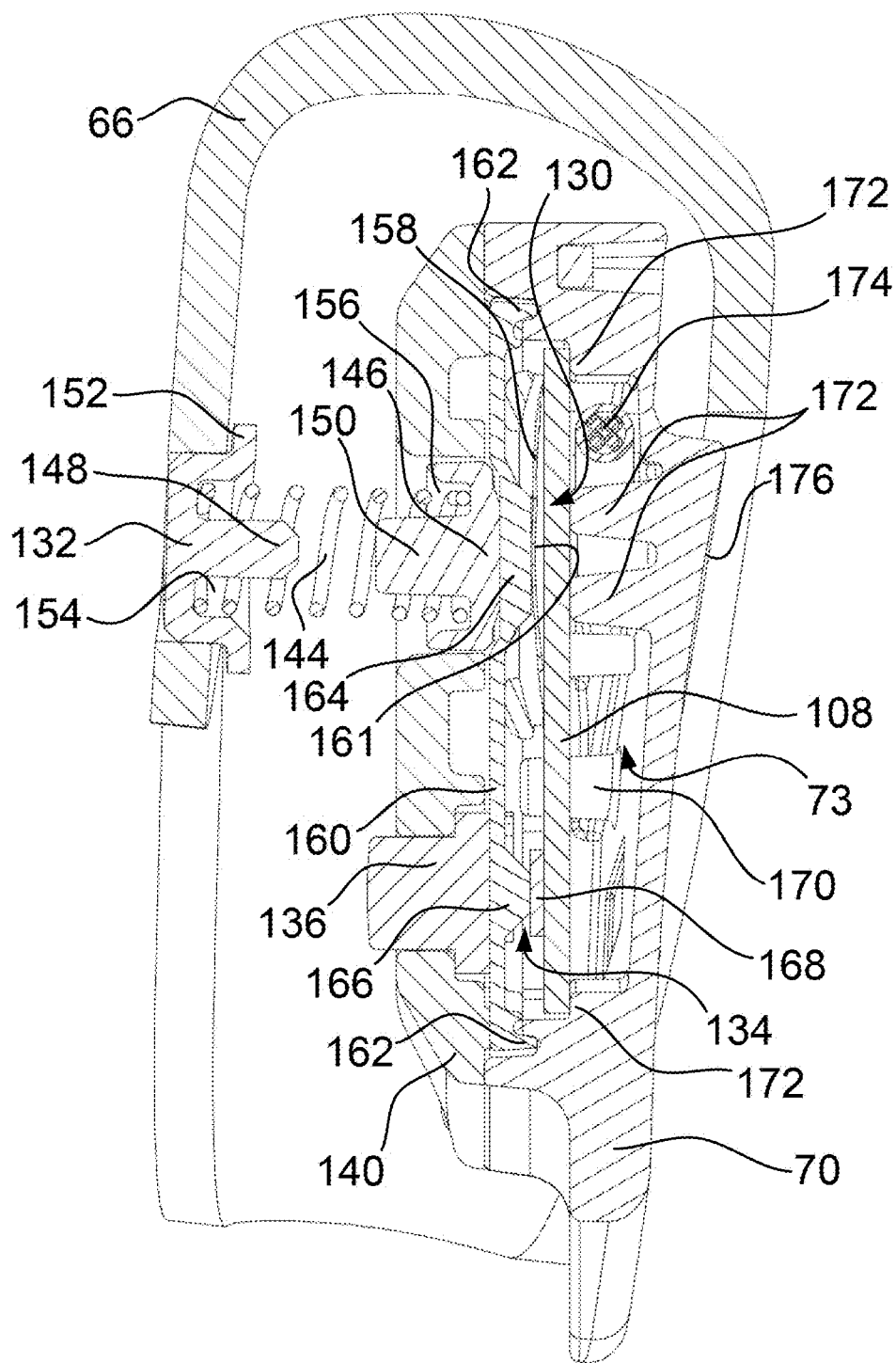
FIG. 11 is a sectional view of a component of the control assembly of FIG. 9 in a non-actuated state.

FIG. 11 is a sectional view of the switch device 70, the brake lever 66, and associated components of FIG. 10, taken along cut line 11-11. The switch device 70 is shown spaced apart from the brake lever 66 by a bias device 144. The bias device 144 may be configured to set a non-actuated, neutral, or rest position of the switch device 70 relative to the brake lever 66. For example, the bias device 144 may urge the first switch lever protrusion 132 of the brake lever 66 away from a first switch control protrusion 146. In an embodiment, the bias device 144 is a coil spring. Alternatively, the bias device 144 may be integrated with another component. For example, the bias device 144 may be unitary or integrated with the control, such as in a leaf spring configuration. A unitary configuration of the bias device 144 may be one of a dome switch, leaf spring, coil spring, or other configuration. A bias stop (not shown) may be provided to limit spacing apart of the first switch lever protrusion 132 from the first switch control protrusion 146 by the bias device 144.

The first switch lever protrusion 132 may be separate from or integrated with the brake lever 66. For example, the first switch lever protrusion 132 may be press fit within the brake lever 66. In an embodiment, the first switch lever protrusion 132 is adhesively mounted.

The first switch lever protrusion 132 may include a lever actuation feature 148. The lever actuation feature 148 may be sized and shaped to contact another component of the first switch assembly 130. For example, the lever actuation feature 148 may contact a control actuation feature 150 of the switch device 70. The control actuation feature 150 may be part of the first switch control protrusion 146. The lever actuation feature 148 may also be configured to control the bias device 144. For example, the lever actuation feature 148 may be sized and shaped concentrically within a coil spring configuration of the bias device 144 to resist buckling of the bias device 144.

The first switch lever protrusion 132 may also include a lever retention feature 152. The lever retention feature 152 may be employed to resist movement of the first switch lever protrusion 132 relative to the brake lever 66 during actuation. In an embodiment, the lever retention feature 152 abuts the brake lever 66 to resist movement. Alternatively, the lever retention feature 152 may be overmolded with the brake lever 66.

The first switch lever protrusion 132 may also include a lever cavity 154 configured to accept the bias device 144. For example, the lever cavity 154 may be annularly shaped and sized to accept a coil spring configuration of the bias device 144.

The first switch control protrusion 146 may include a control cavity 156 configured to accept the bias device 144. For example, the control cavity 156 may be annularly shaped and sized to accept a coil spring configuration of the bias device 144.

The embodiment of FIG. 11 shows the control actuation feature 150 as integral with the first switch control protrusion 146. In this configuration, the lever actuation feature 148 and the control actuation feature 150 may be configured to contact one another in a force transmitting manner. The force transmitting contact may be employed to actuate the first switch assembly 130. Alternatively, the bias device 144 may be configured to actuate the first switch assembly 130 while maintaining a gap between the lever actuation feature 148 and the control actuation feature 150. The bias device 144 is a tunable feature, for instance in spring rate, to actuate the first switch assembly 130.

The first switch assembly 130 includes a first switch 158. The first switch 158 may be metallic and/or electrically conductive. The first switch 158 may be operable to electrically connect components of the control unit 108. For example, the first switch 158 may be a metallic dome switch. In an embodiment, the first switch 158 has at least one electrical connection to the control unit 108 in a non-actuated state, adds at least a second electrical connection to the control unit 108 in a first actuated state, and adds yet at least a third electrical connection to the control unit 108 in a second actuated state. In this embodiment, all three electrical connections exist concurrently in the third actuated state, while only the at least one electrical connection and the second electrical connection exist concurrently in the second actuated state. Alternatively, the first switch 158 may toggle between no electrical connection in a non-actuated state and an electrical connection in an actuated state or vice-versa.

The embodiment of FIG. 11 provides a first switch contact 161 disposed on the first switch 158. In the non-actuated state depicted, the first switch contact 161 is not in electrical communication with (e.g. does not contact) the corresponding respective control unit contact of the control unit 108.

A seal member 160 may be provided. The seal member 160 is configured to seal the control compartment 73. For example, the seal member 160 may be sized and shaped to form a seal between the switch device 70 and the control cover 140. The seal member 160 may be deformable. In an embodiment, the seal member 160 is an elastomeric membrane sealing the switch device 70 to form the control compartment 73. The seal member 160 may be compressed by installation of the control cover, for instance with the control fasteners 142.

In the embodiment of FIG. 11, the seal member 160 includes a seal perimeter 162 configured to form a seal with at least one of the switch device 70 and the control cover 140. The seal perimeter 162 may be one or more ridges or protrusions on the periphery of the seal member 160. In an embodiment, the seal perimeter 162 is sized and shaped to seal with labyrinth and/or mortice configurations of the switch device 70 and/or the control cover 140.

The seal member 160 may include one or more features, such as protrusions, configured to facilitate actuation across the seal member 160. For example, a first seal protrusion 164 may be disposed between the first switch control protrusion 146 and the first switch 158. The first seal protrusion 164 may be configured to transmit force from the first switch control protrusion 146 over a discrete area within the control compartment 73, for example a dome configuration of the first switch 158. The seal member 160 may also include a second seal protrusion 166 disposed between the mode actuator 136 and a mode operator 168 of the mode assembly 134.

The mode operator 168 may be provided. The embodiment of FIG. 11 shows the mode operator 168 disposed on the control unit 108. The mode operator 168 may variously configured to change modes. For example, the mode operation 168 may be a switch, such as a momentary switch or a toggle switch. In an embodiment, actuation of the mode operator 168 opens or closes an electrical connection operative to modify operation of the first switch 158.

The control unit 108 may be sized and shaped to limit relative movement in the control compartment 73. In an embodiment, a control locating member 170 is provided to align the control unit 108 with the switch device 70. The control locating member 170 may be a protrusion of the switch device 70 sized and shaped to pass through the control unit 108. In an embodiment, a PCB configuration of the control unit 108 is aligned within the control compartment 73 using peripheral interaction between the control unit 108 and the control compartment 73 and through interaction of the control locating member 170 with the control unit 108.

One or more of a control support member 172 may also be provided. The control support member 172 may be a plurality of control support members 172 of one or more configurations. For example, the control support members 172 may include at least one protrusion configuration from the switch device 70 and a peripheral recess configuration. The control support members 172 are configured to support the control unit 108. The control support members 172 facilitate operation of at least one of the first switch 158 and the mode operator 168 by locating the control unit 108 relative to the switch device 70.

The embodiment of FIG. 11 provides a control connection 174 configured to facilitate electrical communication between the switch device 70 and other components. In an embodiment, the control connection 174 provides electrical communication between the control unit 108 and the control power source 118. Also in an embodiment, the control connection 174 provides electrical communication between the control unit 108 and at least one of the first and second accessory connections 124, 125. The control connection 174 may be removable, as in a plug connection, or may be sealed to prevent disconnection. In an embodiment the control connection is a cable including one or more conductors (e.g. four conductors) operable for communicating power and/or signals.

The switch device 70 includes at least one of an actuation surface 176 to facilitate operation of the first switch assembly 130. The actuation surface 176 may be configured to receive a user's finger for operation. For example, the actuation surface 176 may be substantially planar to receive a user's finger for operation. Also, the actuation surface 176 may include contours or other curves configured for ergonomic interaction with the user's finger. Alternatively, the actuation surface 176 may be an interactive portion of a button, as in the configuration of the mode assembly 134 in FIG. 11.

Figure 12:
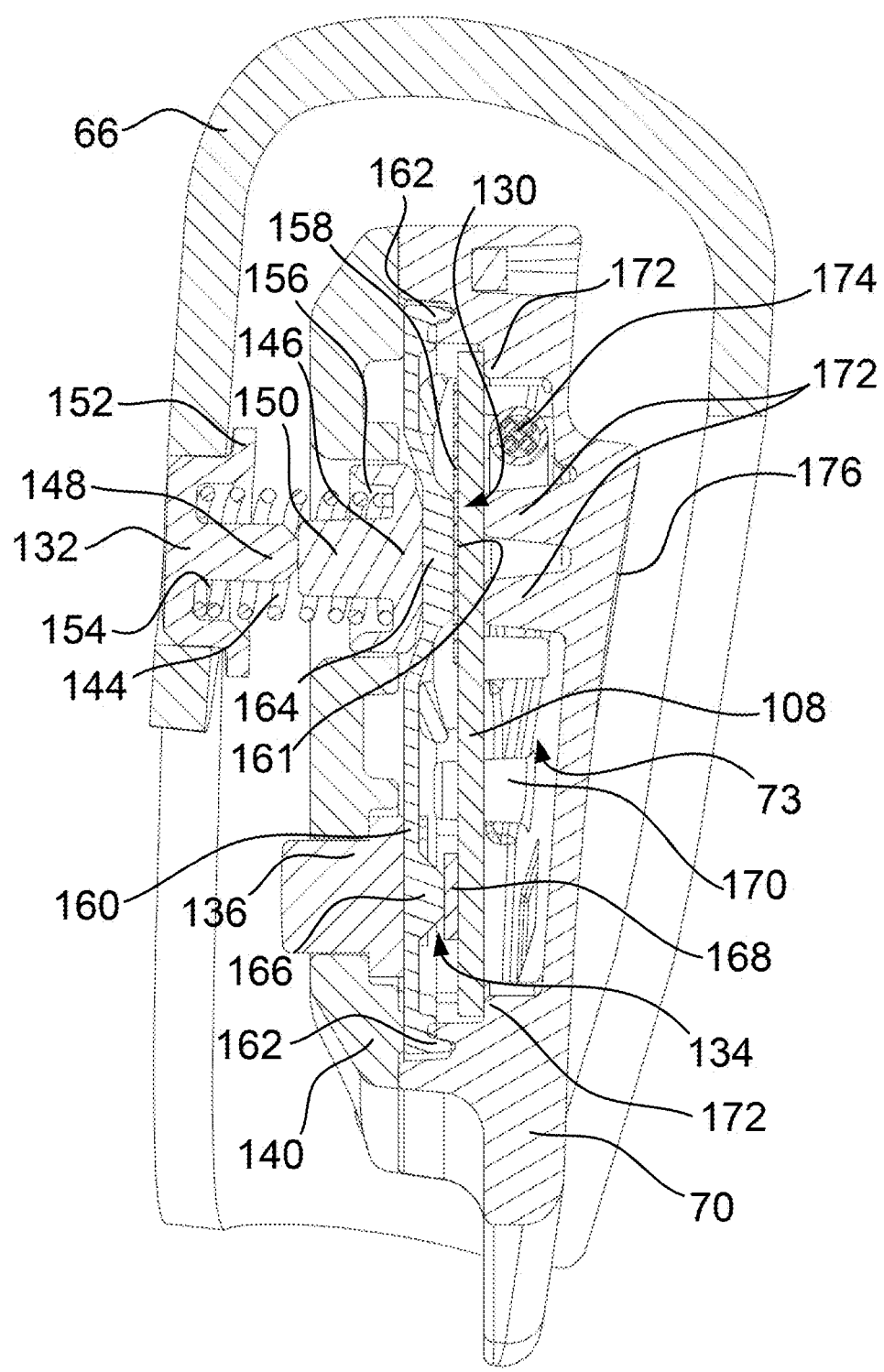
FIG. 12 is a sectional view of the component of FIG. 11 in an actuated state.

FIG. 12 depicts the embodiment of FIG. 11 in the actuation position Y. The actuation position Y may be achieved through a user imparting force to the actuation surface 176, moving the first switch control protrusion 146 yet closer to the first switch lever protrusion 132. The embodiment of FIG. 11 shows the bias device 144 urging apart the first switch control protrusion 146 from the first switch lever protrusion 132. The lever actuation feature 148 may also impart a force on the control actuation feature 150, further urging the first switch control protrusion 146 into the seal member 160.

The first switch lever protrusion 132 and the first switch control protrusion 146 may be sized and shaped to facilitate operation of the first switch from the rest position X to the actuation position Y in the absence of the bias device 144. In an embodiment, the bias device 144 may be omitted. For example, the embodiment of FIG. 9, including the protrusion retention feature may omit the bias device while retaining similar functionality with regard to contact of the first switch 158 and the control unit 108.

The force imparted to the first switch control protrusion 146 is shown to deform the seal member 160 into the actuation position Y as depicted in FIG. 12. The seal member 160 is configured to transmit this force to the first switch 158, urging the first switch into the actuation position Y, which may be defined by the first switch contact 161 contacting the control unit 108. The seal member 160 is shown to transmit this force through the first seal protrusion 164, which may be a thickened elastomeric section of the seal member 160.

The electrical connections in the actuation position Y may result in operation of various components in various states. For example, the control communication device 71 may be operated in the actuation position Y. In an embodiment, the control processor 110 is configured to respond to the flow of electricity in the actuation position Y. For example, the control processor 110 may be configured to send signals with the control communication device 71. In the actuation position Y, the control processor 110 may be configured to send signals to the control communication device 71 to operate the control communication device 71 in an actuation mode. The actuation mode of the control communication device 71 may be an active mode. For instance, the control communication device 71 may be configured to send wireless transmissions in the actuation mode.

Wireless transmissions in the actuation mode may be received by various other components. For example, the control communication device 71 may send transmissions through the control antenna 114 for reception by at least one of the front communication device of the front gear changer 50 and the rear communication device of the rear gear changer 48. Signals sent in the actuation mode may be operation signals configured to trigger a shifting motion. For example, the rear processor 88 and/or the front processor 104 may be configured to perform a shifting motion, with the respective one of the rear motor 86 and/or the front motor 102 responsive to reception of operation signals with the respective one of the rear communication device 90 and/or the front communication device 106.

Receptive components may be further configured to transmit signals. For example, the front processor 104 and/or the rear processor 88 may be configured to generate signals. The front communication device 106 and/or the rear communication device 90 may be configured to transmit signals. In an embodiment, the front communication device 106 is configured to transmit operation signals generated by the front processor 104. The rear communication device 90 may be configured to receive operation signals transmitted by the front communication device 106.

The front and rear gear changers 50, 48 may be configured to communicate directly with one another. For example, the front gear changer 50 may be configured to relay signals from the control to the rear gear changer 48. In an embodiment, the front gear changer 50 is configured to receive an operation signal from the switch device 70, perform a front gear change operation, generate an operation signal with the front processor 104, and transmit the generated operation signal with the front communication device 106. The rear gear changer 48 may be configured to shift responsive to operation signals transmitted by the switch devices 70 and the front gear changer.

The front gear changer 50 may be configured to operate responsive to operation signals transmitted by the rear gear changer 48. The rear gear changer 48 may transmit operation signals similarly to the front gear changer 50 as described above. The front and rear gear changers 50, 48 may transmit and respond to operation signals based on a pattern. In an embodiment, the front and rear gear changers 50, 48 shift within a predetermined shift path.

Shifting may occur within the predetermined shift path, outside of the predetermined shift path, into the predetermined shift path, and out of the predetermined shift path. Different signal types may correspond to different shifting types within this paradigm. For example, in-path signal types may control shifts within the predetermined shift path. Out-of-path signal types may control shifts outside of the predetermined shift path. Path exit signal types may control shifts exiting the predetermined shift path. Path entry signal types may control path entry shifts entering the predetermined shift path.

Individual signals may have multiple signal types. For example, a first signal may have both in-path and out-of-path signal types. The first signal may control upshifts and a second signal may control downshifts within the predetermined shift path. The same signals may also control upshifts and downshifts outside of the predetermined shift path. The first signal may further include the path entry signal type. A third signal may have both out-of-path and path exit signal types. The third signal may further include the in-path signal type.

In an embodiment, the third signal may control a shortcut path shift. For example, the third signal may control a shift with the front gear changer 50 or a recovery shift to a path position. The shortcut path shift may be implemented to perform a shifting operation with the front gear changer 50 before the changeover position in the predetermined shifting path. For example, a shortcut path shift may be performed in anticipation of further upcoming shifting operations in the same path direction, e.g. downshifting near the base of a climb, upshifting near the crest of a climb, or preparing to sprint or attack.

Signal type may depend on an operation state of the drivetrain 18. For example, the first signal may operate with only an in-path signal type when the drivetrain 18 is operating within the predetermined shift path. If the first signal is transmitted when the drivetrain 18 is operating outside of the predetermined shift path, then the first signal may operate with an out-of-path signal type as long as the first signal does not operate the drivetrain 18 into a gear combination of the predetermined shift path. The first signal may operate with a path entry signal type if operation is to shift the drivetrain 18 into a gear combination of the predetermined shift path.

The third signal may have only the path exit signal type, for example if the drivetrain 18 is operating within the predetermined shift path. During operation of the drivetrain 18 within the predetermined shift path, the third signal may further include the in-path signal type, for example if operation according to the third signal would result in shifting from one predetermined shift path gear combination to another. During operation of the drivetrain 18 outside of the predetermined shift path, the third signal may have out-of-path and path entry signal types.

Signal type may be determined by a transmitting device or a receiving device. For example, one of the front and rear gear changers 50, 48 may determine a signal transmitted by the switch device 70 to have a certain signal type upon reception. Alternatively, the switch device 70 may transmit a signal already indicated with a signal type.

Determination of the signal type may depend on variables similar to those relating to election of the predetermined shift path. In an embodiment, determination of signal type is related to the current selection of gear combination. The determination of signal type may also include whether the commanded operation is for an upshift to a higher gear ratio or a downshift to a lower gear ratio. The determination of signal type may further include whether the commanded operation will result in exiting or entering the predetermined shift path.

Regarding the above discussion of signal type, the first, second, and third signals may relate to individual signals and/or combinations of signals. For example, the first and/or second signals may be operation signals transmitted by the switch device 70. In an embodiment, the first signal may be an upshift signal and the second signal a downshift signal transmitted by one or more of the switch device 70. The third signal may be a combination of signals. In an embodiment, the third signal is a combination of substantially simultaneously actuated upshift and downshift signals transmitted by the switch device 70. Substantially simultaneously actuated signals may be defined as occurring within a time frame of one another, such as 0.5 seconds. Substantially simultaneously actuated signals may also be defined through overlapping transmission periods. For example, a processor may be configured to determine signals to be substantially simultaneous if one or more first signals are received between at least two second signals. The substantially simultaneously actuated upshift and downshift signals may be transmitted by the same switch device 70 or by separate ones of the switch device 70 in the system.

Figure 13:
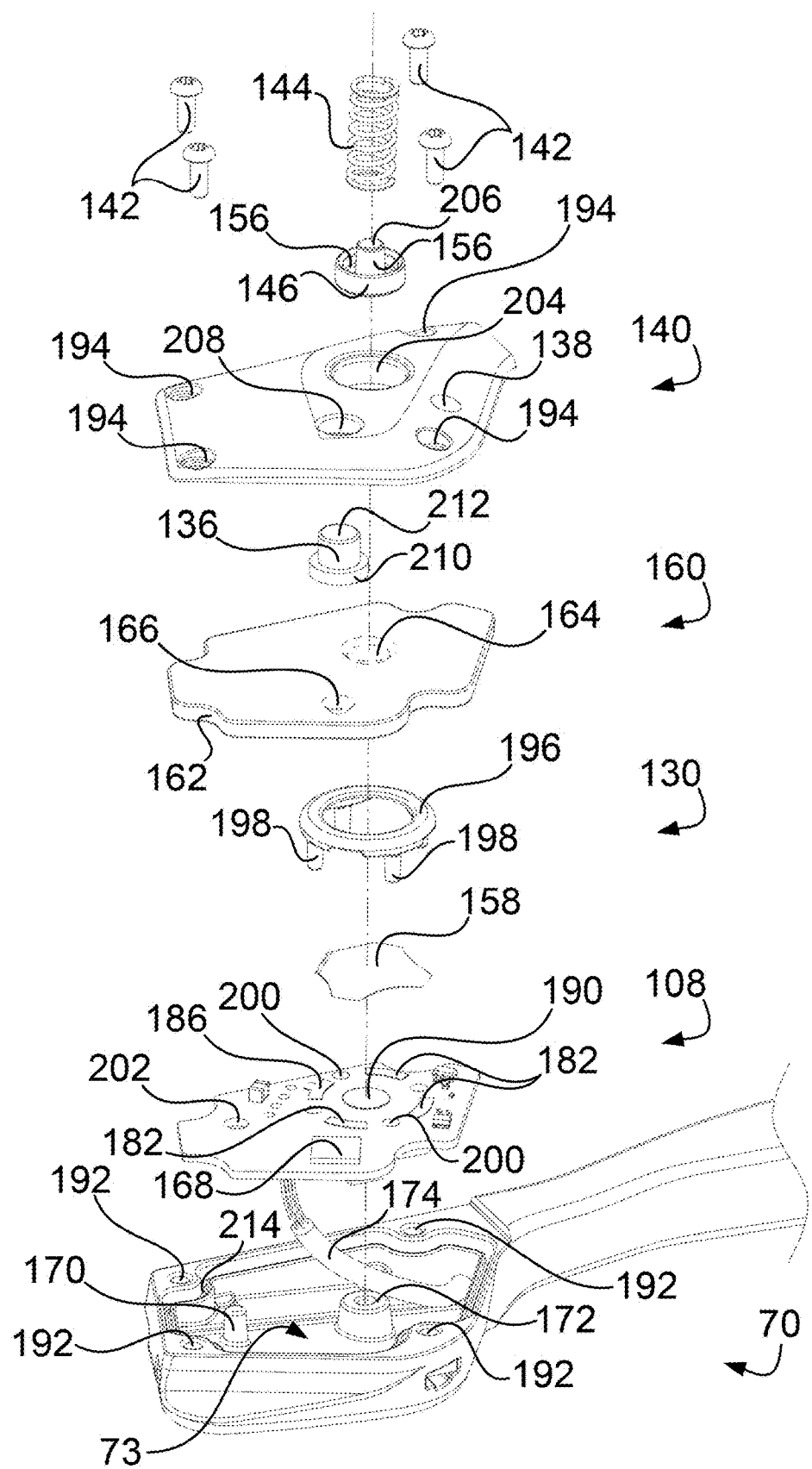
FIG. 13 is an exploded view of the component of the control assembly of FIG. 11.

FIG. 13 is an exploded view of the switch device 70 and associated components of FIG. 9. Each of the control fasteners 142 is shown removed from a control fastener mount 192 in the switch device 70. The control fastener mounts 192 may be threaded holes for receiving threaded screw embodiments of the control fasteners 142.

Each of the control fasteners 142 may be configured to secure the control cover 140 to the switch device 70 through a cover fastener mount 194. The cover fastener mounts 194 may be through holes configured to guide passage of the control fasteners 142 therethrough. The cover fastener mounts 194 may be configured to engage the control fasteners 142 such that the threaded engagement of the control fasteners 142 with the control fastener mounts 192 and the engagement of the control fasteners 142 with the cover fastener mounts 194 urge the switch device 70 together with the control cover 140. In an alternative embodiment, the cover fastener mounts 194 may be threaded holes and the control fastener mounts 192 may be through holes.

The first switch 158 may be located in various ways. For example, a retaining member 196 may be provided. The retaining member 196 may be mountable to the control unit 108 with one or more of a retaining leg 198. A plurality of the retaining legs 198 may be mountable with a plurality of retaining features 200 of the control unit 108. For example, one of the retaining legs 198 may be sized and shaped to fit within a recess configuration of one of the retaining features 200. In an embodiment, the retaining member 196 is secured in place by installation of the control over 140. Alternatively, the retaining member 196 may be bonded to the control unit 108. For example, the retaining legs 198 may be soldered, welded, or adhesively mounted to the retaining features 200.

The retaining features 200 may also be omitted. In an embodiment, the first switch 158 is adhesively mounted to the control unit 108. For example, the first switch 158 may be disposed between the control unit 108 and a film or tape (not shown) fitted over the first switch 158 and secured to the control unit 108.

A locating feature 202 may be provided on the control unit 108 to locate the control unit 108 relative to the switch device 70. For example, the locating feature 202 may be configured to engage with the control locating member 170. In an embodiment, the locating feature 202 is a hole in a circuit board configuration of the control unit 108 configured to accept a post configuration of the control locating member 170.

The first switch control protrusion 146 may be housed in a first switch receiving feature 204. The first switch receiving feature 204 is configured to facilitate operation of the first switch 158 with the first switch control protrusion 146. For example, the first switch receiving feature 204 may be a hole in the control cover 140 through which the first switch control protrusion 146 contacts the first switch 158. In an embodiment, the first switch control protrusion 146 is retained in the first switch receiving feature 204. For example, a protrusion retention feature may be provided to retain the first switch control protrusion 146 between the control cover 140 and the first switch 158.

Referring again to FIG. 13, the first switch control protrusion 146 may be provided with a first switch control actuation surface 206. The first switch control actuation surface 206 may facilitate operation of the first switch 158. For example, a user may apply pressure directly to the first switch control actuation surface 206. In an embodiment, the first switch control actuation surface 206 is configured to interact with the lever actuation feature 148. For example, the first switch control actuation surface 206 may be sized and shaped to displace the first switch control protrusion 146 towards the first switch 158 when the lever actuation feature 148 contacts the first switch control actuation surface 206 as shown in FIG. 11.

The mode actuator 136 may be housed in a mode receiving feature 208. The mode receiving feature 208 is configured to facilitate operation of the mode operator 168 with the mode actuator 136. For example, the mode receiving feature 208 may be a hole in the control cover 140 through which the mode actuator 136 contacts the mode operator 168. In an embodiment, the mode actuator 136 is retained by a mode retaining feature 210. For example, the mode retaining feature 210 may be a relatively large diameter portion of the mode actuator 136. The mode retaining feature 210 may be shaped and sized to not pass through the mode receiving feature 208.

The mode actuator 136 may be provided with mode actuation surface 212. The mode actuation surface 212 may facilitate operation of the mode operator 168. For example, a user may apply pressure directly to the mode actuation surface 212.

The seal member 160 is shown disposed between the first switch 158 and the first switch control protrusion 146 and between the mode operator 168 and the mode actuator 136. The seal member 160 may be an elastomeric membrane configured to seal the switch device 70. For example, the seal member 160 may form a seal between the seal perimeter 162 and a seal feature 214 of the switch device 70. The seal feature 214 may be a groove, ridge, and/or labyrinth configuration about a perimeter of the control compartment 73.

The seal member 160 may be omitted or otherwise configured. For example, an injectable epoxy filling may be used to seal the control compartment 73. The seal member 160 may also be integrated with one or more other components. For example, the seal member 160 may be an elastomeric sealing portion of the control cover 140. In an embodiment, the seal member 160 is omitted and other components are protected from environmental conditions independently, such as with conformal coating.

Figure 14A:
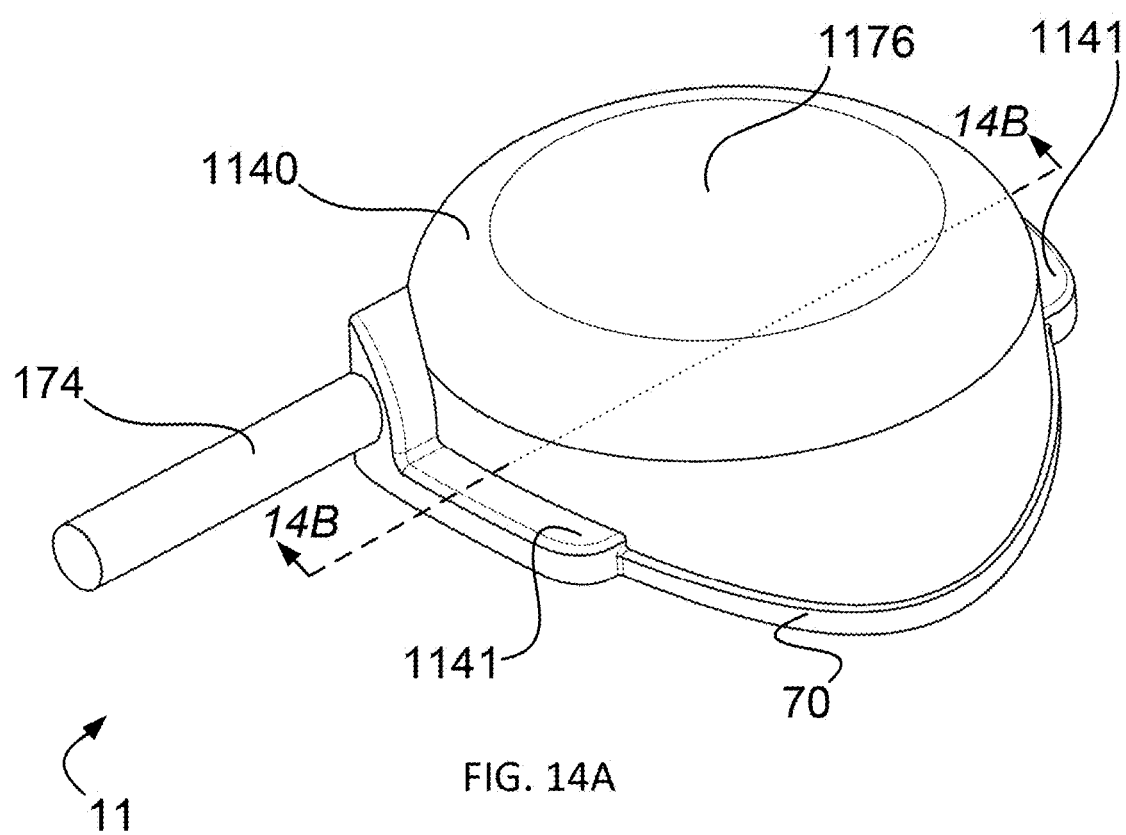
FIG. 14A is an isometric view of an embodiment of a control assembly.

FIG. 14A depicts another embodiment of the control assembly 11. The embodiment of FIG. 14A differs from previous embodiments in that the control assembly 11 is configured for mounting on a straight portion of an embodiment of the handlebar 58 having an annular cross-section. The embodiment of the switch device 70 depicted may be mounted in various orientations. For example, the switch device 70 shown may be mounted to the stem 54, the frame 12, one or more of a handlebar extension 2063, or other components of the bicycle 10.

The switch device 70 shown may be used in place of or in addition to other embodiments. For example, the switch device 70 may communicate wirelessly or through the control connection 174 with the embodiment of the switch device 70 shown in FIG. 11. Multiple embodiments of the switch device 70 implemented may be configured as redundant or supplemental devices. For example, operation of an embodiment of the switch device 70 shown in FIG. 15 connected to an embodiment of the switch device 70 shown in FIG. 11 may result in the same signals and same functionality as operation of that embodiment of the switch device 70 to which it is connected. Operation of opposing embodiments of the switch device 70 (e.g. left and right mountings) may be configured to supplement the signals and functionality of each other. For example, a left mounted embodiment of the switch device 70 may be configured to send a downshift signal and a right mounted embodiment of the switch device 70 may be configured to send an upshift signal.

The switch device 70 may be mounted to the handlebar 58 or other components with one or more of a securing portion 1141. The securing portion 1141 may be a plurality of securing protrusions. In an embodiment, adhesive components (not shown), cable ties (not shown), or the like may be employed to secure the switch device 70 and/or the securing portion 1141. Installation of handlebar tape (not shown) over the switch device 70 and the handlebar 58 may additionally or alternatively secure the switch device 70 to the handlebar 58.

The control assembly 11 of FIG. 14A includes an elastomeric embodiment of a control cover 1140. The control cover 1140 may be configured to seal the control compartment 73 from external conditions. For example, the control cover 1140 may be sized and shaped to deformably mount over the switch device 70 in a sealing manner. In an embodiment, the control cover 1140 is adhesively mounted to the switch device 70.

Figure 14B:
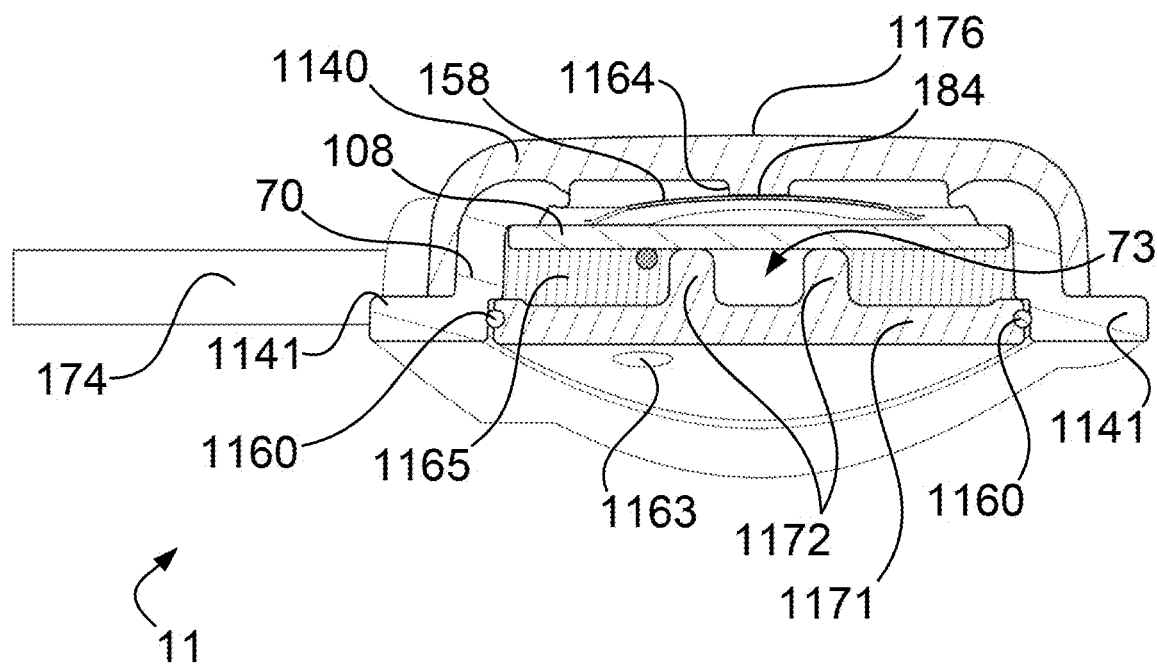
FIG. 14B is a sectional view of the control assembly of FIG. 14A.

As in FIG. 14B, the control compartment 73 may also include an embodiment of a seal member 1160. The seal member 1160 may be provided to form a seal between the switch device 70 and a support structure 1171. The support structure 1171 may be provided as a removable component from the switch device 70. In an embodiment, the support structure 1171 may be installed to overmolded embodiments of the switch device 70 and the control cover 1140 after installation of internal components, including the control unit 108.

The embodiment of the control cover 1140 in FIGS. 14A and 14B includes an embodiment of an actuation surface 1176. The actuation surface 1176 shown is deformable for operation of the first switch 158. A user may operate the actuation surface 1176 to move the first switch 158 from the rest position X, to the actuation position Y.

FIG. 14B is a sectional view of the control assembly 11 of FIG. 14A. The embodiment shown may also include contacts disposed on the control unit 108 as in other embodiments. For example, the control unit 108 may include the unit first contact 186, the unit second contact 190, and/or a plurality of mounting contacts 182.

An actuation protrusion 1164 may be provided to facilitate operation of the first switch 158. For example, the control cover 1140 may include the actuation protrusion 1164 to impart pressure applied to the actuation surface 1176 to the first switch 158. The actuation protrusion 1164 may be configured to direct pressure to a central portion of the first switch 158. For example, the actuation protrusion 1164 may be sized and shaped to concentrate an actuation force on the first switch interaction surface 184.

The support structure 1171 may be provided with one or more of a control support member 1172 for supporting the control unit 108. In an embodiment, two of the control support members 1172 are employed for stabilization of the control unit 108. The control support members 1172 may also be omitted or provided on the control unit 108.

Other components may be provided between the support structure 1171 and the control unit 108. For example, a seal compound 1165 may be provided. The seal compound 1165 may be an elastomeric component installed before the control compartment 73 is closed. Alternatively, the seal compound 1165 may be injected into the control compartment 73 after installation of the support structure 1171. The seal compound 1165 may be an adhesive material and/or an epoxy.

One or more of a vacancy 1163 may be provided for installation of the seal compound 1165. For example, a first embodiment of the vacancy 1163 may be provided for injecting the seal compound 1165 and a second embodiment of the vacancy 1163 may be provided to allow evacuation of gas during injection and to facilitate effective injection. The vacancy 1163 may be filled after installation of the seal compound 1165.

Figure 15A:
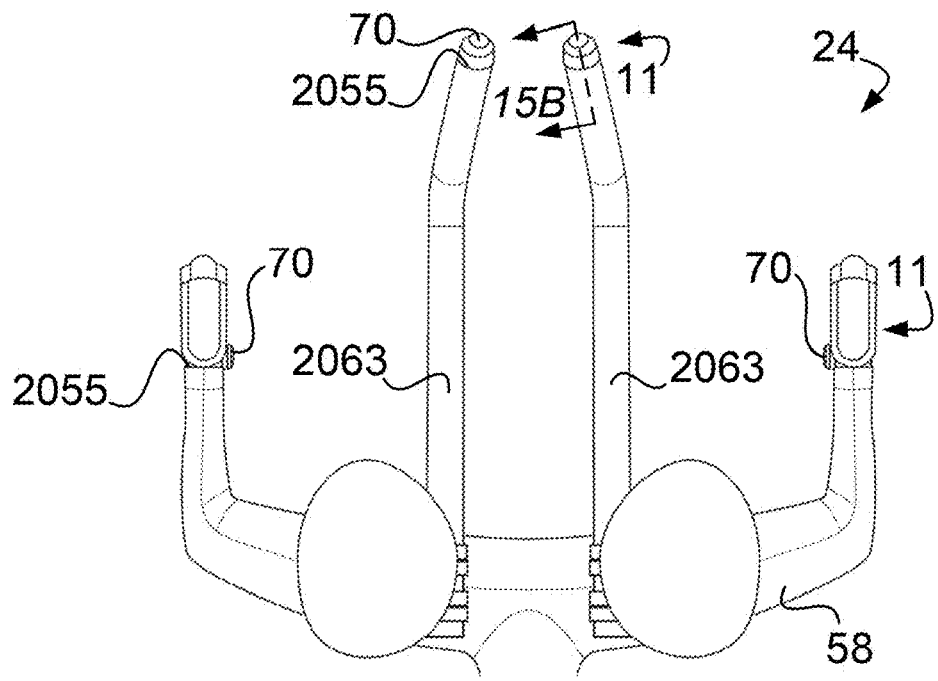
FIG. 15A is an isometric view of an embodiment of a control assembly.

FIG. 15A depicts an alternative embodiment of the handlebar assembly 24, including an embodiment of the control assembly 11. The control assembly 11 may be at least partially disposed within an embodiment of the handlebar assembly 24. In an embodiment, the control assembly 11 extends partially into an open end 2055 of the handlebar assembly 24.

The handlebar assembly 24 depicted in FIG. 15A includes two of the handlebar extension 2063. The handlebar extension 2063 may be formed integrally with the handlebar 58 or may be a removable, adjustable, and/or separate component. For example, the handlebar extension 2063 may be clamped to the handlebar 58. At least one of the open ends 2055 may be provided on the handlebar extension 2063 for receiving the control assembly 11. One or more of the open ends 2055 may be provided on other parts of the handlebar assembly 24 for receiving the control assembly 11, for instance as indicated in FIG. 3A.

Figure 15B:
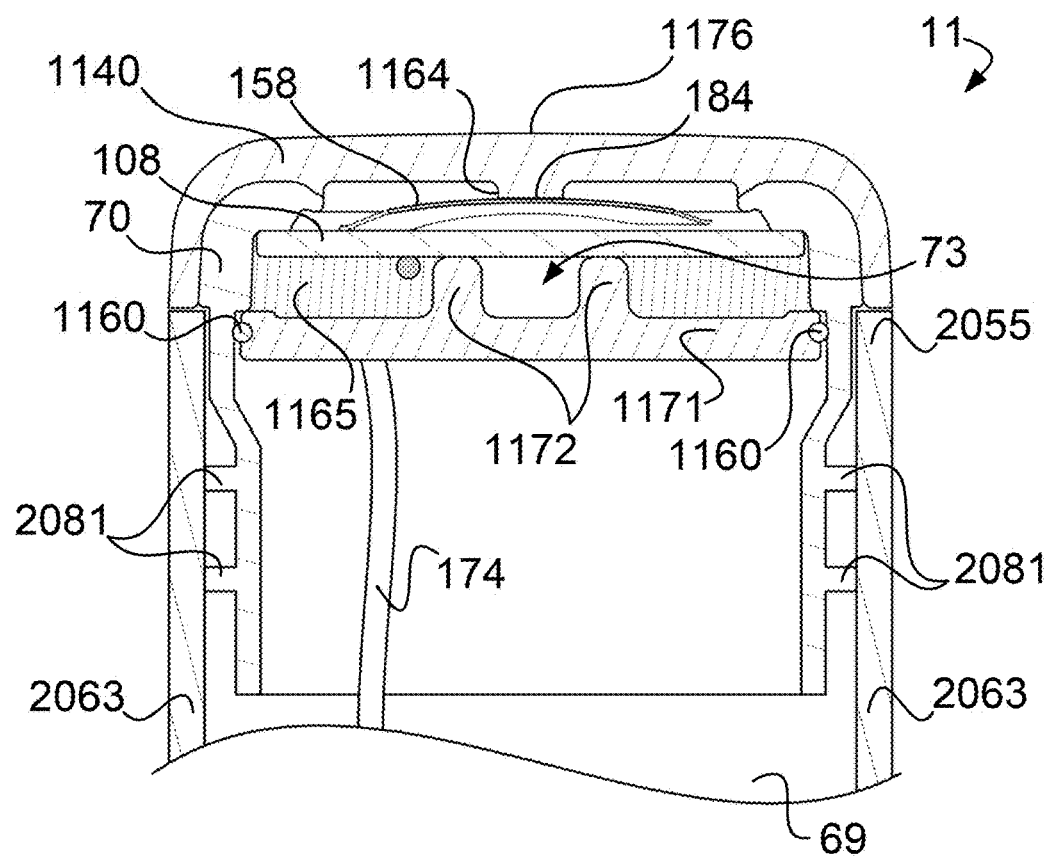
FIG. 15B is a sectional view of the control assembly of FIG. 15A.

FIG. 15B is a sectional view of the control assembly 11 of FIG. 15A. A portion of the switch device 70 is shown disposed within the open end 2055 of the handlebar extension 2063. Another portion of the switch device 70 is disposed external to the handlebar extension 2063 and is covered with the control cover 1140. The control cover 1140, the switch device 70, and/or another component may abut the open end 2055 of the handlebar extension 2063 to limit insertion therein.

The switch device 70 may include one or more of a securing protrusion 2081. In an embodiment, the securing protrusion 2081 comprises a plurality of securing protrusions. The securing protrusions 2081 may be integrated with or affixed to the switch device 70. In an embodiment, the securing protrusions 2081 are provided on an elastomeric sleeve (not shown) configured to fit between the switch device 70 and the handlebar extension 2063. The securing protrusions 2081 may be overmolded with the switch device 70.

The control unit 108 may communicate in various ways with other components. For example, FIG. 15B depicts an embodiment having the control connection 174. The control connection 174 is shown internal to the switch device 70 and passing through a handlebar interior 69 of the handlebar assembly 24. In such a way, the control connection 174 may electrically communicate through the handlebar extension 2063 or the handlebar 58. The control connection 174 may also be disposed external to the handlebar assembly 24. For example, the control connection 174 may pass along outside the handlebar extension 2063 and may also be secured using handlebar wrap or tape (not shown).

The control unit 108 depicted in FIG. 15B may connect to another component, for instance the embodiment of the control unit provided in FIG. 11. This connection may be a wired connection, as through the control connection 174, or may be wireless. The control unit 108 may also be configured to wirelessly communicate with other components, such as the rear gear changer 48 and/or the front gear changer 50.

Figure 16:
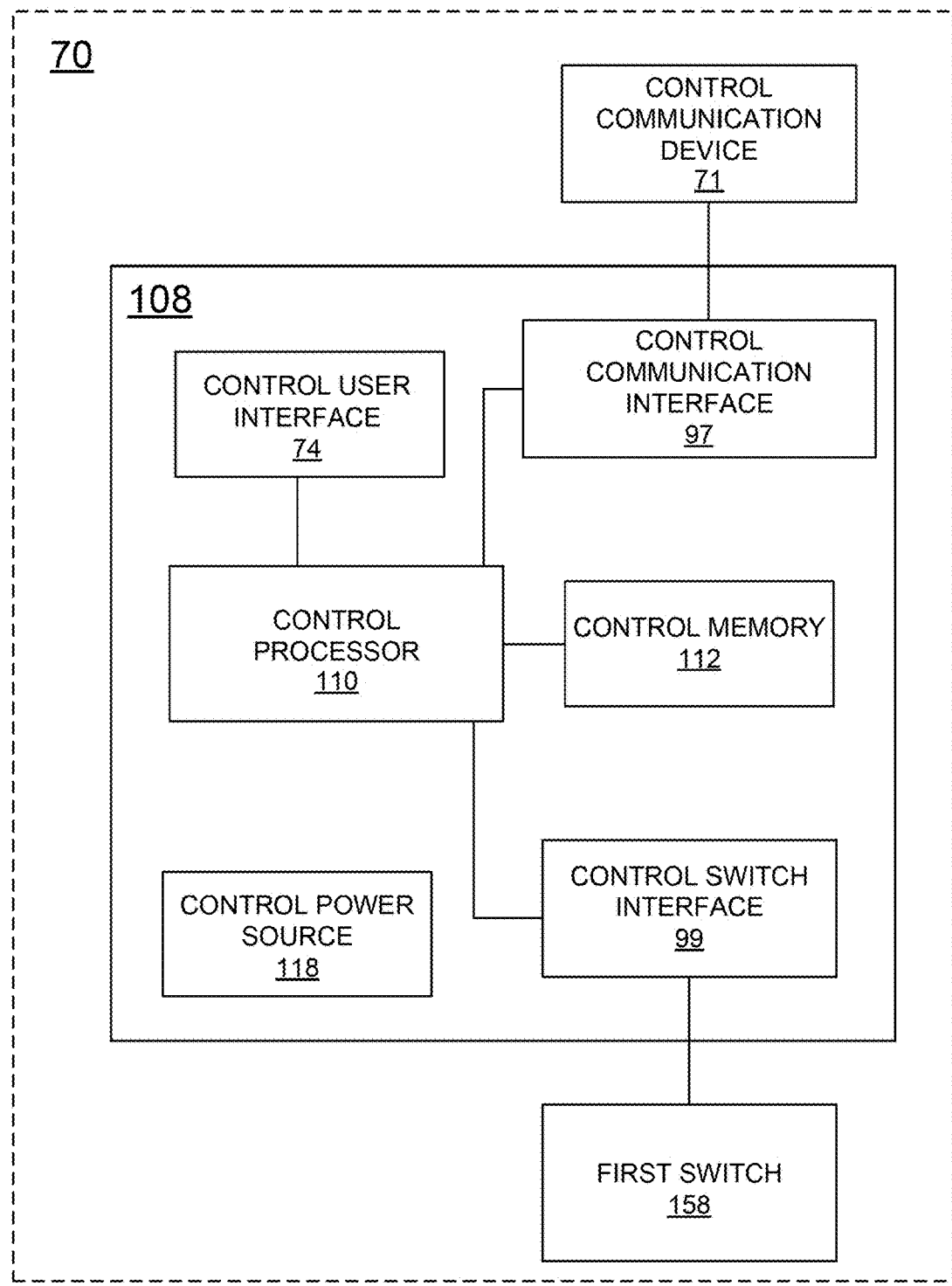
FIG. 16 is a block diagram of an embodiment of a control assembly.

FIG. 16 is a block diagram of an embodiment of the control assembly 11. The control assembly 11 may be used alone to communicate with and control bicycle components, or the control assembly 11 may be used in conjunction with at least one other control system for components of the bicycle, such as a primary embodiment of the control assembly 11 like that of FIG. 9 that may include alternative control assemblies such as those of FIGS. 14A and 15A.

The control assembly 11 is provided with the control unit 108, which includes the control processor 110, the control memory 112, the control user interface 74, the control power source 118, a control communication interface 97, and a control switch interface 99. In an embodiment, the control communication interface 97 is in communication with the control communication device 71 and the control switch interface 99 is in communication with the first switch 158. Additional, different, or fewer components may be provided. For example, the control user interface 74 may be omitted.

The control processor 110 may include a general processor, digital signal processor, an ASIC, FPGA, analog circuit, digital circuit, combinations thereof, or other now known or later developed processor. The control processor 110 may be a single device or combinations of devices, such as through shared or parallel processing.

The control power source 118 is a portable power source, which may be stored internal to the control assembly 11 or stored external to the control assembly 11 and communicated to the control assembly 11 through a power conductive cable. The control power source 118 may involve the generation of electric power, for example using a mechanical power generator, a fuel cell device, photo-voltaic cells, piezoelectric, or other power-generating devices. The control power source 118 may include a battery such as a device consisting of two or more electrochemical cells that convert stored chemical energy into electrical energy. The control power source 118 may include a combination of multiple batteries or other power providing devices. Specially fitted or configured battery types, or standard battery types such as CR 2012, CR 2016, and/or CR 2032 may be used.

The control switch interface 99 provides for data communication from one or more switches of the control assembly 11 to the control unit 108. For example, the control switch interface 99 may facilitate communication from at least one of the first switch 158 and the mode operator 168 to the control processor 110. The control switch interface 99 includes wired conductive signal and/or data communication circuitry operable to interpret signals provided by different embodiments of the switch device 70. For example, the control switch interface 99 may include a series of ports for receiving control assembly input cables. Each of the ports may be distinguishable by the control processor 110 through grouping tables or arrays, or through physical circuits or other circuitry that provide for grouping control assembly inputs.

The control user interface 74 may be one or more buttons, keypad, keyboard, mouse, stylus pen, trackball, rocker switch, touch pad, light sensor, voice recognition circuit, or other device or component for communicating data between a user and the control assembly 11. The control user interface 74 may be a touch screen, which may be capacitive or resistive. The control user interface 74 may include a liquid crystal display ("LCD") panel, LED, LED screen, thin film transistor ("TFT") screen, or another type of display. The control user interface 74 may also include audio capabilities, or speakers.

The control communication interface 97 is configured to send, with the control communication device 71, data such as anticipation signals, operation signals, and/or other signals for reception with bicycle components. The control communication interface 97 may also be configured to receive data such as status signals from the rear gear changer 48 and/or the front gear changer 50. The control communication interface 97 communicates the data using any operable connection. An operable connection may be one in which signals, physical communications, and/or logical communications may be sent and/or received. An operable connection may include a physical interface, an electrical interface, and/or a data interface. The control communication interface 97 provides for wireless communications through the control communication device 71 in any now known or later developed format. Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS)

represent examples of the state of the art. Such standards are periodically superseded by faster or more efficient equivalents having essentially the same functions. Accordingly, replacement standards and protocols having the same or similar functions as those disclosed herein are considered equivalents thereof.

Figure 17:
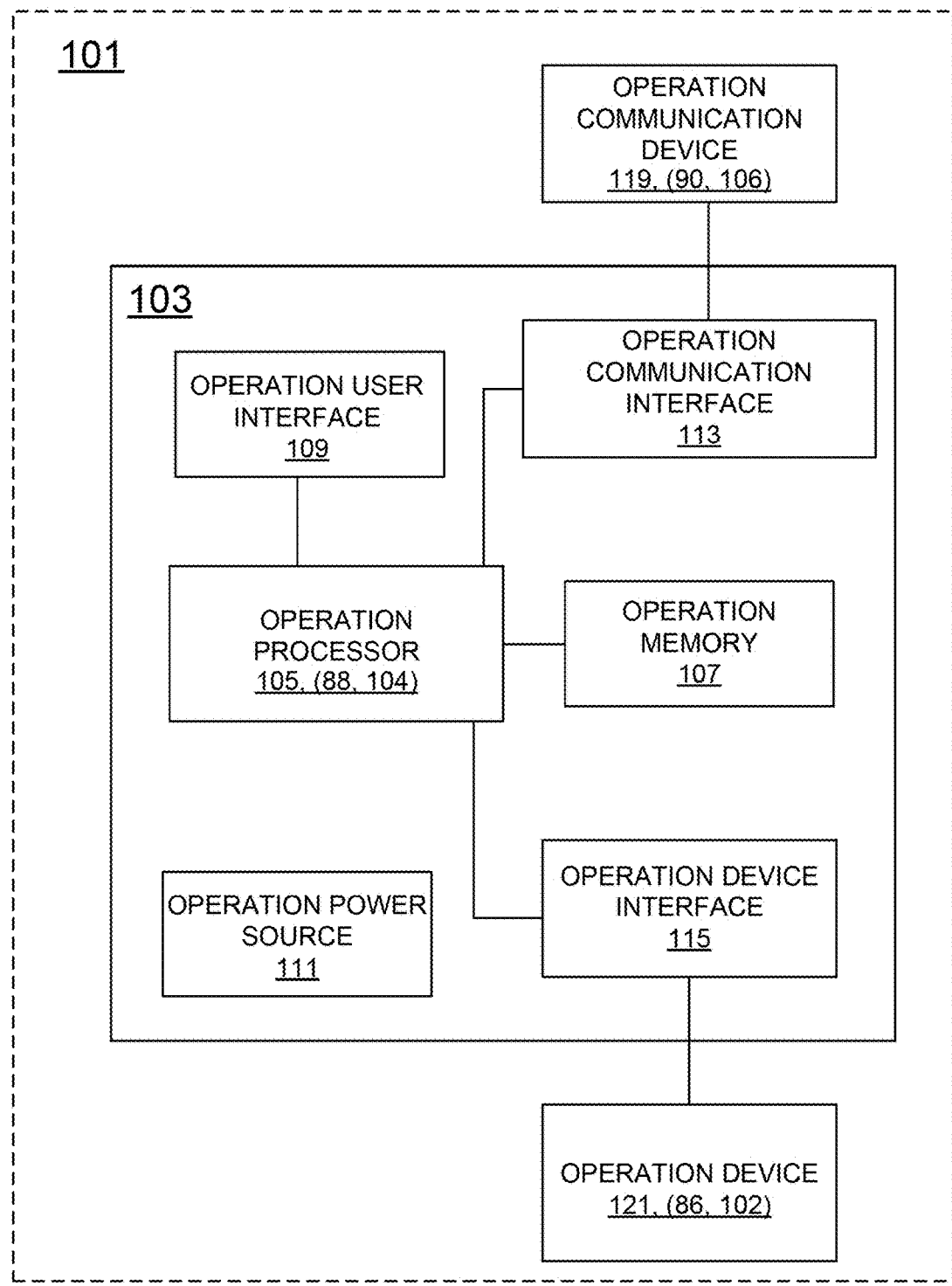
FIG. 17 is a block diagram of an embodiment of a gear changer.

FIG. 17 is a block diagram of an operation component 101. The operation component 101 may be one or more of a previously described component, for instance at least one of the rear gear changer 48 and the front gear changer 50. The operation component 101 may also be another component, such as an internal gearbox component, a suspension or an adjustable suspension component, or an adjustable seating component. A plurality of operation components 101 may be provided. Each element shown in FIG. 17 may be associated with such components. For example, an operation processor 105 may be the rear processor 88 and/or the front processor 104 (e.g. a gear changer processor).

The operation component 101 is provided with an operation unit 103, which may be a circuit board or alternative configuration as described above. The operation unit 103 includes the operation processor 105, an operation memory 107, an operation user interface 109, an operation power source 111, an operation communication interface 113, and an operation device interface 115. In an embodiment, the operation communication interface 113 is in communication with an operation communication device 119 and the operation device interface 115 is in communication with an operation device 121, for example a motor such as the front or rear motors 102, 86. The operation communication device 119 may be a gear changer communication device, for example the rear communication device 90 and/or the front communication device 106. Additional, different, or fewer components may be provided. For example, the operation user interface 109 may be omitted.

The structure, connections, and functions of the operation processor 105 may be representative of those of the rear processor, the front processor, or another component. The operation processor 105 may include a general processor, digital signal processor, an ASIC, FPGA, analog circuit, digital circuit, combinations thereof, or other now known or later developed processor. The operation processor 105 may be a single device or combinations of devices, such as through shared or parallel processing.

The operation memory 107 may be a volatile memory or a non-volatile memory. The operation memory 107 may include one or more of a ROM, a RAM, a flash memory, an EEPROM, or other type of memory. The operation memory 107 may be removable from the operation component 101, such as an SD memory card. In a particular non-limiting, exemplary embodiment, a computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

The operation memory 107 is a non-transitory computer-readable medium and is described to be a single medium. However, the term "computer-readable medium" includes a single medium or multiple media, such as a centralized or distributed memory structure, and/or associated caches that are operable to store one or more sets of instructions and other data. The term "computer-readable medium" shall also include any medium that is capable of storing, encoding or carrying a set of instructions for execution by a processor or that cause a computer system to perform any one or more of the methods or operations disclosed herein.

The operation power source 111 is a portable power source, which may be stored internal to the operation component 101 or stored external to the operation component 101 and communicated to the operation component through a power conductive cable. The operation power source 111 may involve the generation of electric power, for example using a mechanical power generator, a fuel cell device, photo-voltaic cells, piezoelectric, or other power-generating devices. The control power source 118 may include a battery such as a device consisting of two or more electrochemical cells that convert stored chemical energy into electrical energy. The control power source 118 may include a combination of multiple batteries or other power providing devices. Specially fitted or configured battery types, or standard battery types may be used.

The operation device interface 115 provides for operation of a component of the bicycle 10. For example, the operation device interface 115 may transmit power from the operation power source 111 to generate movement in the operation device 121. In various embodiments, the operation device interface 115 sends power to control movement of at least one of the rear motor and the front motor. The operation device interface 115 includes wired conductive signal and/or data communication circuitry operable to control the operation device 121.

The operation user interface 109 may be one or more buttons, keypad, keyboard, mouse, stylus pen, trackball, rocker switch, touch pad, voice recognition circuit, or other device or component for communicating data between a user and the operation component 101. The operation user interface 109 may be a touch screen, which may be capacitive or resistive. The operation user interface 109 may include an LCD panel, LED, LED screen, TFT screen, or another type of display. The operation user interface 109 may also include audio capabilities, or speakers.

The operation communication interface 113 is configured to receive, with the operation communication device 119, data such as anticipation signals, operation signals, and/or other signals from bicycle components, for instance the switch device 70. The operation communication interface 113 may also be configured to send data such as status signals for reception with the switch device 70. Status signals may be identified by operation. For instance, status signals of the front and/or rear gear changers 50, 48 may be front and/or rear shift status signals. For example, the front gear changer 50 may transmit a front shift status signal. The operation communication interface 113 communicates the data using any operable connection. An operable connection may be one in which signals, physical communications, and/or logical communications may be sent and/or received. An operable connection may include a physical interface, an electrical interface, and/or a data interface. The operation communication interface 113 provides for wireless communications through the operation communication device 119 in any now known or later developed format.

Figure 18:
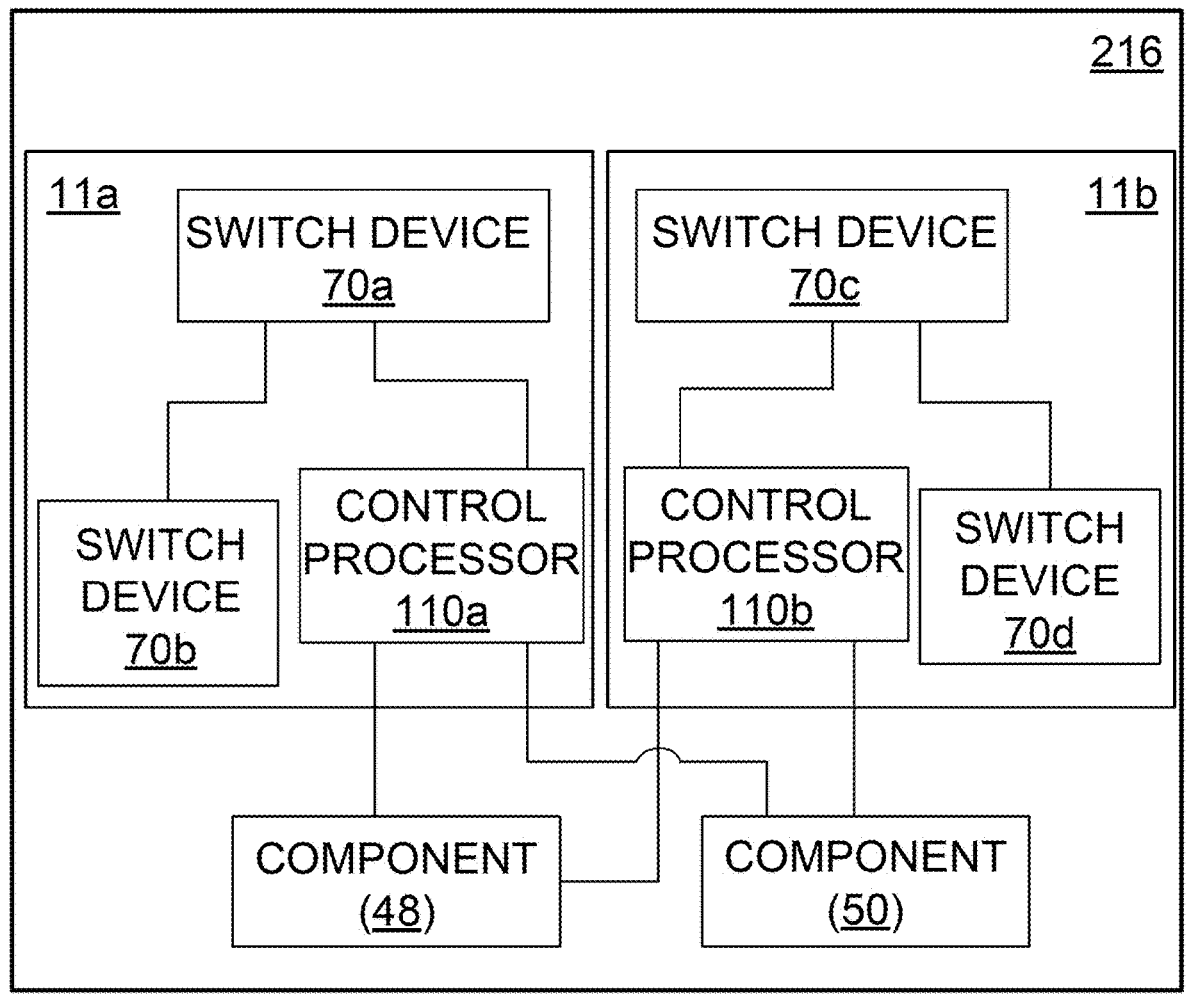
FIG. 18 is a block diagram of an embodiment of an electromechanical control system.

FIG. 18 is a block diagram of an embodiment of an electromechanical control system 216 for a bicycle 10. The electromechanical control system 216 may include one or more configurations of the switch devices 70. For example, the embodiment of the switch device 70 in FIG. 9 may be connected to the control processor 110 and to the embodiment of the switch device 70 in FIG. 14A. This configuration may together comprise an embodiment of the control assembly 11. A plurality of the switch devices 70 may connect to a single control processor 110 directly or, as shown and described above, through another of the switch devices 70. In an embodiment, a left control assembly 11a has a left primary switch device 70a connected to a left secondary switch device 70b and/or a right control assembly 11b has a right primary switch device 70c connected to a right secondary switch device 70d. In an embodiment, a left control processor 110a may be responsive to inputs to the left control assembly 11a and/or a right control processor 110b may be responsive to inputs to the right control assembly 11b.

The control processor 110 may communicate with at least one component. For instance, the control processor 110 may communicate with the rear gear changer 48 and/or the front gear changer 50. Communication between the control processor 110 and components may be wired or wireless. A plurality of the control processors 110 may be associated with a plurality of components. For example, one or more components may be configured to listen for signals sent by a plurality of the control processors 110. In an embodiment, two of the control processors 110 each communicate with both the rear gear changer 48 and the front gear changer 50.

FIG. 19 is a diagram of shift positions. For example, positions of the predetermined shift path may be shown this way. A diagram of combination shift positions is shown as having a selection of two sprockets on one axis and twelve sprockets on another axis, however these specific numbers may be adjusted as described above. In an embodiment, the front gear changer 50 is configured to toggle between two front gear selections. The rear gear changer 48 may be configured to shift between a plurality of more than two rear gear selections, for example the plurality of rear gear or sprocket selections, such as the twelve shown.

The predetermined shift path may have various component paths. For example, the predetermined shift path may have an upshift path and a downshift path. As shown, the upshift path is represented with upshift path gear combinations U1-U15. The downshift path is represented with downshift path gear combinations D1-D15. The downshift and upshift paths may be the same.

The paths may be referenced using rear positions R1-R12 and front positions F1 and F2. The rear positions R1-R12 correspond to axial displacements of the rear gear changer 48. The front positions F1 and F2 correspond to axial displacements of the front gear changer 50. Movement from F1 to F2 happens in the outboard direction O and movement from F2 to F1 happens in the inboard direction P. Movement from R1 to R12 happens in the outboard direction O and movement from R12 to R1 happens in the inboard direction P.

Transitions between the high and low gears of the chainring assembly 40 may be referred to as changeover positions. For example, FIG. 19 depicts an upshift changeover position between U9 and U10 and a downshift changeover position between D9 and D10. The upshift changeover starts on the rear sprocket assembly 42 at the rear position R9 and ends at R7. The downshift changeover starts at R4 and ends at R6. Each of these changeover operations results in a movement of one sprocket on the chainring assembly 40 and an opposite movement of two sprockets on the sprocket assembly 42.

The changeover positions may be adjusted depending on use case. For example, a rider who prefers minimal front shifts may prefer a system where the upshift and downshift changeover operations start at relatively distant rear positions. A rider may alternatively prefer closely spaced changeover operation start points, for example to maintain a more direct chainline in certain circumstances.

As discussed above, various signals and signal types may be used to control operation within, outside of, exiting, and entering the predetermined shift path. In an embodiment, the operation signal transmitted by a first one of the switch device 70 controls an upshift through the path and the operation signal transmitted by a second one of the switch device 70 controls a downshift through the path. For example, actuating a right-hand embodiment of the switch device 70 at the in-path combination F1/R9 may control the front gear changer 50 to perform an upshift operation and the rear gear changer 48 to perform two downshift operations to reach the in-path combination F2/R7, the result being a path upshift. Actuating a left-hand embodiment of the switch device 70 at the in-path combination F2/R4 may control the front gear changer 50 to perform a downshift operation and the rear gear changer 48 to perform two upshift operations to reach the in-path combination F1/R6, the result being a path downshift.

A combination signal derived from the operation signals sent by the first and second ones of the switch devices 70 may control a path exit shift. For example, a second signal and/or combination of first signals transmitted by one or more of the switch devices may control a shift from a path gear combination to an outside gear combination. In an embodiment, a combination signal from a pair of switch devices 70 is configured to shift both the front and rear gear changers 50, 48 from a path gear combination to an outside gear combination. For example, the combination signal received at path gear combination F2/R10 may control a downshift to outside combination F1/R11, indicated as Y2 in the upshift path component and Y5 in the downshift path component.

During operation outside of the path, the first signals may control movement of the rear gear changer 48. For example, from outside combination F1/R11, a first signal transmitted by the switch device 70 may be configured to shift up to F1/R12 or to shift down to F1/R10. In an embodiment, a rider may shift down to F1/R7 without re-entering the predetermined shift path. Alternatively, the rider may re-enter the predetermined shift path by shifting the rear derailleur to achieve F1/R9.

Whether an operation achieves re-entering the path may depend on whether the operations are downshifts or upshifts. For example, downshifts may trigger operation on the downshift component path and/or upshifts may trigger operation on the upshift component path. If a user continues to only downshift from F1/R11 to reach F1/R7, then he or she will not have triggered re-entering of the path in the described embodiment because operation remains on the downshift component path. If a downshift signal is transmitted to control the rear gear changer 48 down to F1/R8, then an upshift control signal is transmitted, the user will have transitioned to the upshift component path at F1/R9, a path gear combination. Once the path is re-entered, in-path operation may continue until another path exit signal is transmitted.

A gear lockout or protection may also be provided. This protection may prevent physically detrimental gear combinations, such as those where outside portions of the chain 44 might run against sprockets of the sprocket assembly 42 and/or chainring assembly 40 adjacent to the sprockets currently engaged by the chain 44. For example, certain gear combinations may be inaccessible in-path and/or out-of-path. In an embodiment, the rear gear changer 48 will not perform a commanded shift to protected positions. The front gear changer 50 may also be configured to avoid protected positions. For example, the front gear changer 50 may be configured to not perform a commanded shift to protected positions. In an embodiment, the front and rear gear changers 50, 48 cooperate to avoid protected positions. For example, the front gear changer 50 may perform a commanded shift by avoiding a protected gear combination through simultaneous and/or cooperative movement of the rear gear changer 48.

Protected gear combinations may be tunable. For example, there may be different protected gear combinations for in-path and out-of-path operating environments. In an embodiment, the gear combinations F2/R1 and F1/R12 are protected for the out-of-path operating environment and low cross-chain positions Z1-Z6 (corresponding to gear combinations F2/R1, F2/R2, and F2/R3) and high cross-chain positions Y1-Y6 (corresponding to gear combinations F1/R10, F1/R11, and F1, R12) are protected for the path operating environment.

Fringe positions may be described between protected positions and path component positions. For example, during upshifting, high fringe positions X1-X3 may be protected. During downshifting, low fringe positions W1-W3 may be protected. Transitioning between upshifting and downshifting may make the low fringe positions W1-W3 and/or the high fringe positions X1-X3 accessible through an alternate one of the path components.

A hysteresis zone may be defined between opposite fringe positions and a cross-chain positions. For example, the upshift component path may have a hysteresis zone defined between the low fringe positions W1-W3 and the high cross-chain positions Y1-Y3. The hysteresis zone may be tunable. For example, the rider who prefers to minimize the frequency of shifting operations with the front gear changer 50 may prefer a wide hysteresis zone, while a rider who prefers to optimize chainline may prefer a narrower hysteresis zone. As above, adjusting the changeover positions may be used to adjust the hysteresis zone.

Figure 20A:
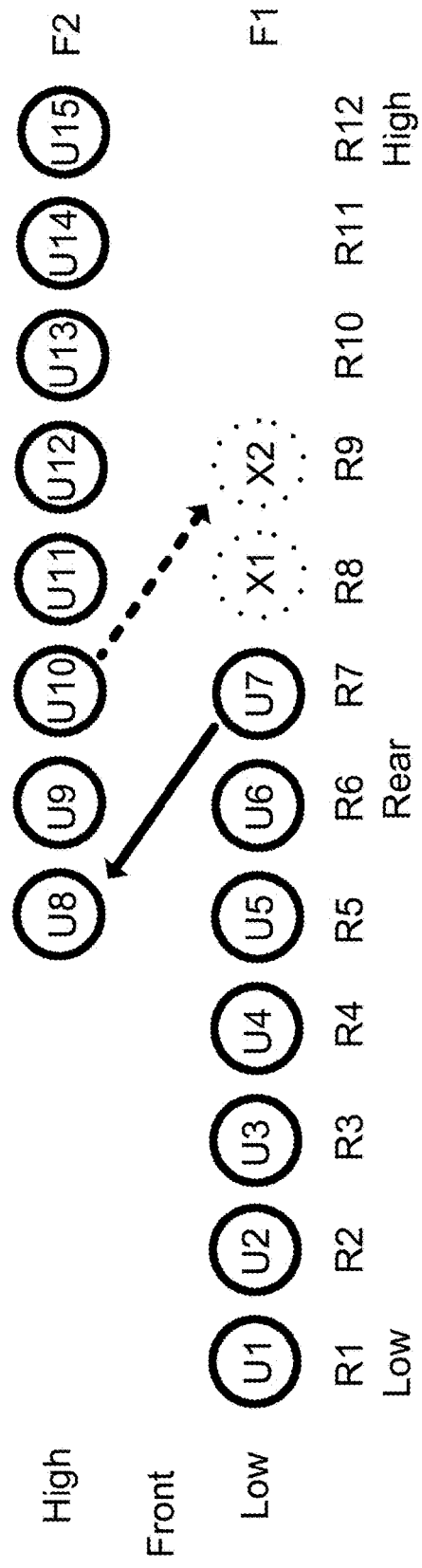
FIG. 20A is a diagram of an upshift path.

FIG. 20A is a diagram of an upshift path. The upshift path of FIG. 20A differs from the path shown in FIG. 19 in that the changeover position is nearer a middle point of travel of the rear gear changer 48. As above, the upshift changeover position may be tunable. Similarly, a number of rear positions changed over during an upward recovery shift may be tunable. For example, one, two, three, or more rear downshifts may be made during the upward recovery shift.

FIG. 20A depicts a recovery path exit shift followed by a path entry shift similar to that described with reference to FIG. 19. The path exit shift is shown by the dashed line between positions U10 and X2. If the rider commands a shift back to the path, for example with a rear downshift to X1 followed by another rear downshift to U7, then operation will continue as in the predetermined shift path.

Figure 20B:
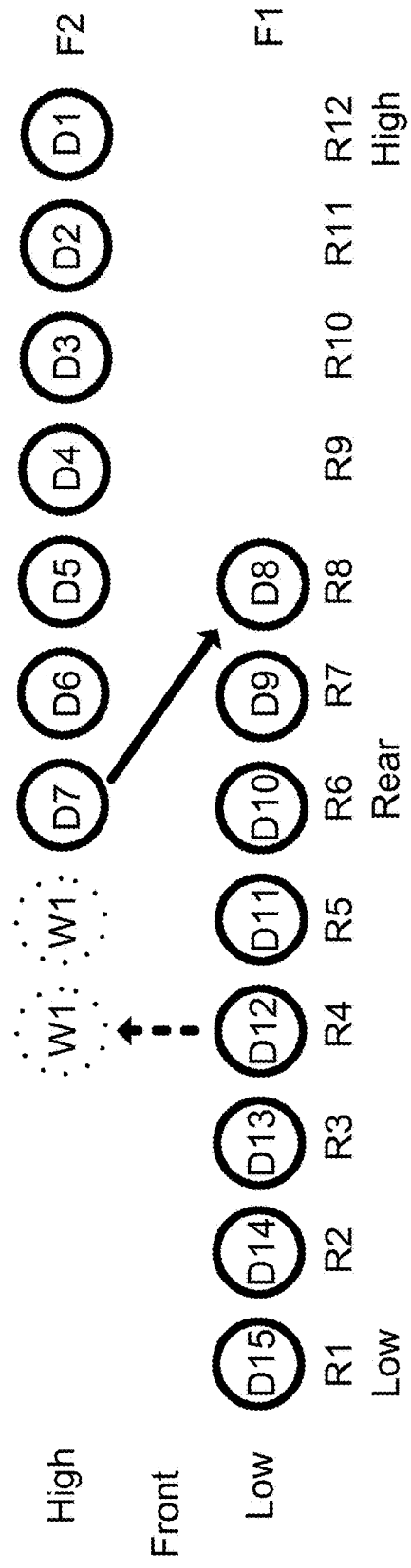
FIG. 20B is a diagram of a downshift path.

FIG. 20B is a diagram of a downshift path. The downshift path of FIG. 20B differs from the path shown in FIG. 19 in that the changeover position is nearer a middle point of travel of the rear gear changer 48. As above, the downshift changeover position may be tunable. Similarly, a number of rear positions changed over during a downward recovery shift may be tunable. For example, one, two, three, or more rear upshifts may be made during the downward recovery shift.

FIG. 20B depicts a non-recovery path exit shift followed by path entry shift. The path exit shift is shown by the dashed line between positions D12 and W1. If the rider commands a shift back to the path, for example with a front upshift back to D12, then operation will continue as in the predetermined shift path.

Figure 21:
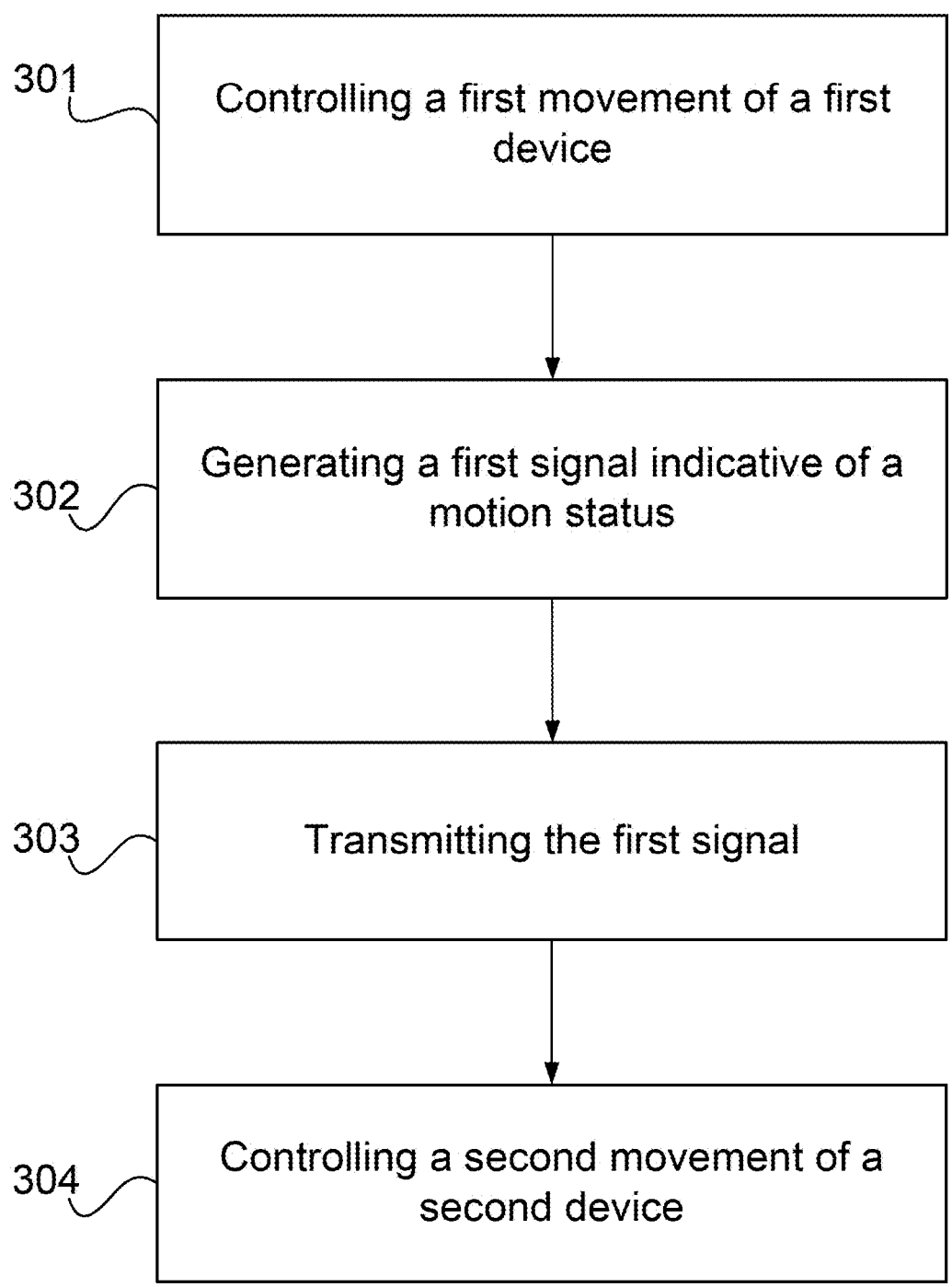
FIG. 21 is a flow chart of an embodiment of a method for electromechanical control of a bicycle.

FIG. 21 is a flow chart of an embodiment of a method for electromechanical control of the bicycle 10. The flowchart also illustrates a method for transmitting and receiving wireless signals on a bicycle. As presented in the following sections, the acts may be performed using any combination of the components indicated in previous figures. For example, the following acts may be performed by the control assembly 11 and the operation component 101, as well as additional or other components. In an embodiment, the acts may be performed by one or more of the control communication device 71, the control processor 110, the operation communication device 119, the operation processor 105, and the operation device 121. Additional, different, or fewer acts may be provided. For example, Act 301 may be omitted. The acts are performed in the order shown or in other orders. The acts may be repeated.

The method includes controlling a first movement of a first device (Act 301). The first movement may be a shifting movement. For example, the first movement may be a gear change movement of the chain 44 from a first sprocket to a second sprocket. In an embodiment, the first movement is either an upshift or a downshift.

The first device may be a gear changing device, for example the front gear changer 50 or the rear gear changer 48. In an embodiment, the first device is the front gear changer 50. The front gear changer may be controlled to perform either an upshift or a downshift.

Control of the first device may be effected by a transmitting device. For example, the switch device 70 may be implemented as described above to control the first movement of the first device. The first device may, as described above, be configured to receive signals from the switch device 70.

The method also includes generating a first signal indicative of a motion status (Act 302). The first signal may be generated by one or more components. For example, the first signal may be generated by the first device. The first device may comprise multiple components. In an embodiment, the first device comprises the front processor 104, the front motor 102, and the front communication device 106. The first device may receive a signal from the switch device 70 with the front communication device 106, perform a shifting operation with the front motor 102, and/or generate the first signal indicative of the motion status with the front processor 104.

The first signal is configured to indicate a motion status. The motion status may be a state of current movement and/or a state of recent movement. For example, the motion status may indicate that a gear change operation is taking place or has taken place. The motion status may be represented as started, completed, in progress, and/or at a specific point of progress. For example, a motion sensing device such as a transducer may be used to communicate a specific motion status. Alternatively or additionally, motion status may be transmitted as a function of time. For example, a shifting operation may take place over one or more known time intervals, after which a motion status signal is transmitted. In an embodiment, the first signal is indicative of the front movable member 96 being in motion. Specifically, the first signal may be indicative of the front gear changer 50 currently shifting between adjacent sprockets.

The method also includes transmitting the first signal (Act 303). The first signal may be transmitted by one or more devices. For example, the first device may be configured to transmit the first signal. In an embodiment, the front gear changer 50 is configured to transmit the first signal with the front communication device 106.

The method also includes controlling a second movement of a second device (Act 304). The second movement may be a shifting movement. For example, the second movement may be a gear change movement of the chain 44 from a first sprocket to a second sprocket. In an embodiment, the second movement is either an upshift or a downshift.

The second device may be a gear changing device, for example the front gear changer 50 or the rear gear changer 48. In an embodiment, the second device is the rear gear changer 48. The rear gear changer may be controlled to perform either an upshift or a downshift.

Control of the second device may be effected by a transmitting device. For example, the first device's transmission of the first signal as described above may be configured to control the second device. The second device may comprise multiple components. In an embodiment, the second device comprises the rear processor 88, the rear motor 86, and the rear communication device 90. The second device may receive a signal from the first device with the rear communication device 90, perform a shifting operation with the rear motor 86, and/or operate the rear motor 86 with the rear processor 88.

The method may include a delay between steps. For example, a system implementing the method may be configured to pause between controlling the first movement of the first device (Act 301) and generating the first signal indicative of the motion status (Act 302) and/or to pause between generating the first signal indicative of the motion status (Act 302) and controlling the second movement of the second device (Act 304). In an embodiment, the method is configured with a delay between transmitting the first signal (Act 303) and controlling the second movement of the second device (Act 304). The delay may derive from delay in the second device receiving a wireless signal from the first device due to intermittent transmitting and listening mismatch. Alternatively or additionally, the first and/or second devices may be specifically configured to delay the second movement of the second device. For example, the first device may delay generating and/or transmitting the first signal. In an embodiment, the second device may be configured to receive the first signal and pause before controlling the second movement of the second device. For example, the first signal may include a delay component controlling the second device to shift after a pause.

A delay between controlling the first movement of the first device and controlling the second movement of the second device may be implemented to adjust shifting coordination. For example, the first device may perform the first movement more rapidly than the second device performs the second movement. In the case of gear changing, the front gear changer 50 may perform a shift more slowly than the rear gear changer 48. The delay may correspond to an operational time. For example, the delay duration may be similar or equal to a front shift duration, describing an operational time to perform a front shifting operation.

The chain 44 may react adversely to improperly timed combination gear changes wherein both the front and rear gear changers 50, 48 perform shifting operations. In the example of recovery shifts, the rear gear changer 48 is required to adjust tension with the tension device 87 more rapidly than in either of the component shift operations of the recovery shift operation. For example, shifting to smaller sprockets with both the front and rear gear changers 50, 48 may result in the tension pulley 89 moving in the tensioning direction sharply. Conversely, shifting to larger sprockets with both the front and rear gear changers 50, 48 may result in the tension pulley 89 moving in the detensioning direction rapidly. In the case of a damped configuration of the tension device 87 as described above, shifting substantially simultaneously may be advantageous to overcome an initial damping force once.

Although the movement (Acts 301, 304) are each listed once, it should be recognized that these movements may take place at any point throughout the method. For example, a second instance of controlling the first movement (Act 301) could take place concurrently or subsequently to the controlling of the second movement (Act 304).

Figure 22:
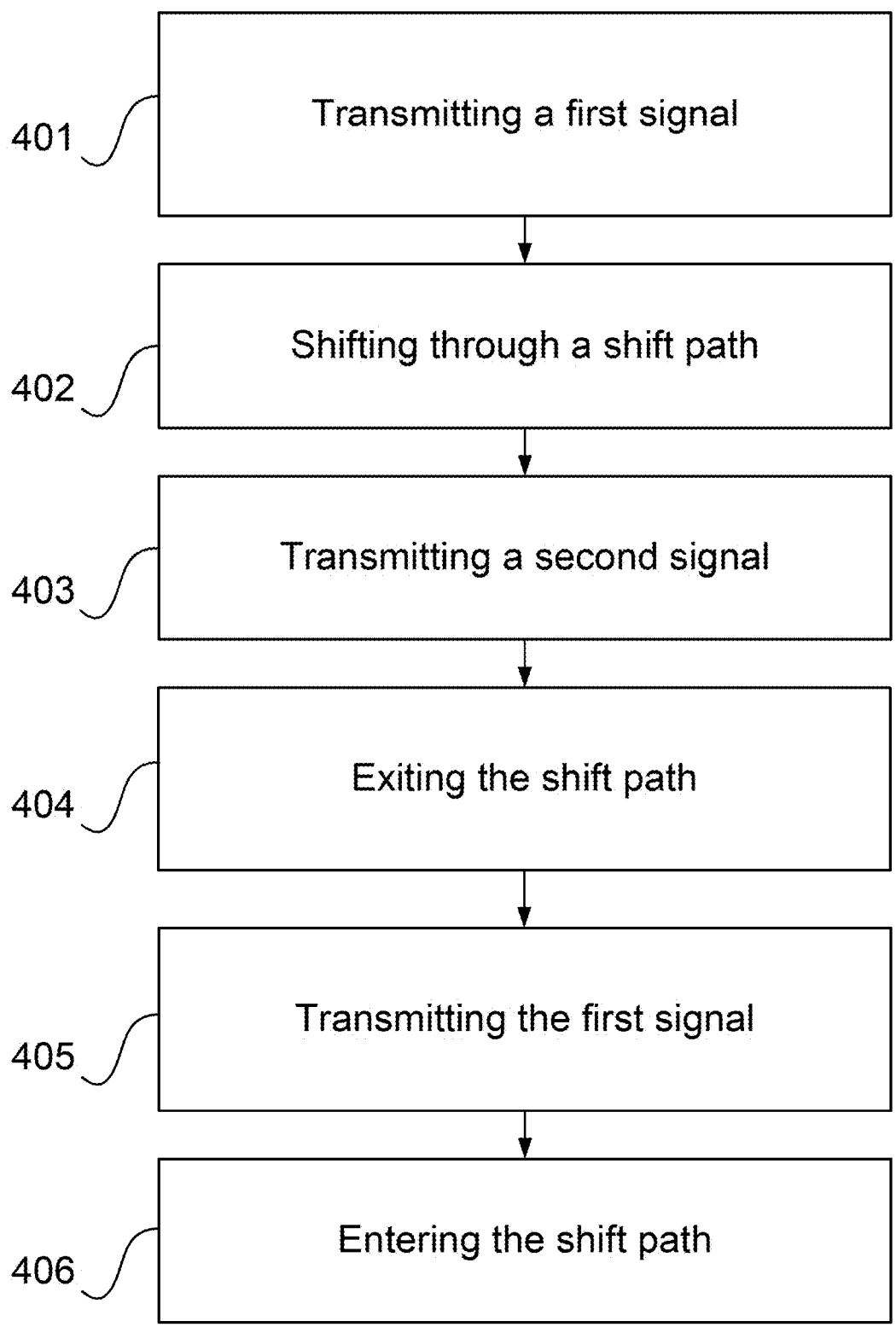
FIG. 22 is a flow chart of an embodiment of a method for electromechanical control of a bicycle.

FIG. 22 is a flow chart of an embodiment of a method for electromechanical control of the bicycle 10. The flowchart also illustrates a method for transmitting and receiving wireless signals on a bicycle. As presented in the following sections, the acts may be performed using any combination of the components indicated in previous figures and as shown in FIG. 18 and described above with reference thereto. The acts are performed in the order shown or in other orders. The acts may be repeated.

The method includes transmitting a first signal (Act 401). The first signal may be transmitted with one or more devices. For example, the first signal may be transmitted with one or more of the switch devices 70, as through the control communication device 71 described above. The first signal may be configured to control one or more components, for example one or both of the front and rear gear changers 50, 48.

The method also includes shifting through a shift path (Act 402). The shift path may be any path of shifting between various gear combinations. For example, the shift path may be the predetermined shift path as described above. In an embodiment, a system is configured to shift either up or down through the predetermined shift path responsive to the first signal. For example, the front and rear gear changers 50, 48 may be configured to receive the first signal and shift responsive to its reception. In an embodiment, one of the front and rear gear changers 50, 48 is configured to receive the first signal and transmit another signal to the other of the front and rear gear changers 50, 48 configured to relay control from the device transmitting the first signal.

The method also includes transmitting a second signal (Act 403). The second signal may be similar to the first signal. For example, the second signal may be transmitted by one or more of the switch devices 70. In an embodiment, the second signal is a combination of signals transmitted by a pair of the switch devices 70. For example, the second signal may comprise a first signal transmitted by a first one of the switch devices 70 and a first signal transmitted by a second one of the switch devices 70. First signals may be bounded by time constraints to form the second signal. For example, first signals may need to be transmitted and/or received substantially simultaneously for the second signal to transmit. In an embodiment, at least one of the front and rear gear changers 50, 48 is configured to pause upon receiving a first signal for a simultaneous press detection delay, which pause may be known as a detection period. Such delay may facilitate effective reception of the second signal by accounting for human delay or inconsistency in actuation.

The method also includes exiting the shift path (Act 404). Exiting the shift path may be responsive to one or more devices receiving the second signal. For example, one or both of the front and rear gear changers 50, 48 may be configured to exit the predetermined shift path responsive to receiving the second signal. In an embodiment, the front gear changer 50 is configured to perform an out-of-path shift responsive to the second signal. In another embodiment, the rear gear changer 48 is configured to perform an out-of-path shift responsive to the second signal. In another embodiment, the front and rear gear changers 50, 48 are configured to perform an out-of-path recovery shift responsive to the second signal.

The method also includes a second instance of transmitting the first signal (Act 405). The second instance of transmitting the first signal may be similar to its first instance. For example, the first signal may be transmitted by one or both of the switch devices 70 in an embodiment having right and left ones of the switch devices 70.

The method also includes entering the shift path (Act 406). A previous shift path, such as the predetermined shift path, may be re-entered. Alternatively, a new path may be entered depending on operation variables such as cadence, speed, power, heart rate, and/or inclination. In an embodiment, one or both of the front and rear gear changers 50, 48 are configured to shift back into the predetermined shift path responsive to receiving the first signal during operation outside of the predetermined shift path.

A system may be configured to continue shifting outside of the predetermined shift path responsive to the first signal. For example, the rear gear changer 48 may operate outside of the shift path responsive to iterations of the first signal until the chain 44 is shifted to a sprocket corresponding to a gear combination within the predetermined shift path. In an embodiment, the system is configured to re-enter the predetermined shift path when it is shifted through out-of-path commands into an in-path gear combination. A first signal, a second signal, or another type of signal may be configured to control the system to an in-path gear combination.

Although the shifting through a shift path (Act 402) is listed once, this may be repeated. For example, the method may involve many instances of shifting through the shift path until the second signal is transmitted (Act 403).

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations and/or acts are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that any described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. An electromechanical shifting system for a bicycle, comprising:
   a first gear changer including a first processor, a first operation device, and a first communication device, the first processor configured to:
   control a first movement of the first operation device,
   generate a first signal indicative of a first motion status, and
   transmit the first signal using the first communication device; and a second gear changer including a second processor, a second operation device, and a second communication device, the second processor configured to:
receive the first signal using the second communication device; and
control a second movement of the second operation device,
wherein after receiving the first signal, the second gear changer is configured to pause for a first length of time before controlling a second movement of the second device.

2. The electromechanical shifting system of claim 1, wherein the first communication device is a wireless transmitter and the second communication device is a wireless receiver.

3. The electromechanical shifting system of claim 1, wherein the first gear changer is a front gear changer configured to toggle between two front gear selections and the second gear changer is a rear gear changer configured to shift between a plurality of more than two rear gear selections.

4. The electromechanical shifting system of claim 3, wherein the first movement is an inboard shift and the second movement is an outboard shift.

5. The electromechanical shifting system of claim 4, wherein the second movement is not performed if the second gear changer is disposed axially in line with one of a set of three smallest radius rear sprockets.

6. The electromechanical shifting system of claim 1, further configured to delay shifting for a second length of time between performing the first movement and performing the second movement.

7. The electromechanical shifting system of claim 6, wherein the first signal is a front shift status signal transmitted after a front shift duration, the front shift duration equal to the second length of time.

8. The electromechanical shifting system of claim 6, wherein the second processor is further configured to cancel the second movement if a second control signal is received during the second length of time.

9. An electromechanical shifting system for a bicycle, comprising:
a predetermined shift path, comprising:
a plurality of first gear positions;
a plurality of second gear positions; and
a change position at which a first gear changer performs a first gear changer shift between the plurality of first gear positions in a first direction and a second gear changer performs a second gear changer shift between the plurality of second gear positions in a second direction;
a first signal configured to control an upward path shift to a higher ratio gear selection within the predetermined shift path;
a second signal configured to control a downward path shift to a lower ratio gear selection within the predetermined shift path; and
a third signal configured to control a path exit shift outside of the predetermined shift path, wherein the path exit shift comprises shifting between the plurality of first gear positions and the plurality of second gear positions.

10. The electromechanical shifting system of claim 9, wherein the first direction and the second direction are opposing directions.

11. The electromechanical shifting system of claim 9, wherein the third signal is further configured to control a path entry shift into the predetermined shift path.

12. The electromechanical shifting system of claim 9, wherein the third signal is a combination of signals.

13. The electromechanical shifting system of claim 12, wherein the first gear changer comprises:
a first gear changer communication device configured to receive the first, second, and third signals; and
a first gear changer processor configured to determine the third signal has been received when the first signal and the second signal are received by the first gear changer communication device within a detection period.

14. The electromechanical shifting system of claim 13, wherein the first gear changer is configured to transmit a fourth signal responsive to receiving the third signal, the fourth signal configured to control the second gear changer shift between the plurality of second gear positions.

15. The electromechanical shifting system of claim 14, wherein the second gear changer comprises:
a second gear changer communication device configured to receive the first, second, and fourth signals; and
a second gear changer processor configured to control the second gear changer shift responsive to the second gear changer communication device receiving the fourth signal.

16. An electromechanical shifting system for a bicycle, comprising:
a control unit;
a first gear changer; and
a second gear changer, wherein the first gear changer and the second gear changer are configured to:
shift up through a plurality of gear combinations of a predetermined shift path responsive to a first signal transmitted by the control unit;
shift down through the plurality of gear combinations of the predetermined shift path responsive to a second signal transmitted by the control unit;
shift to an outside gear combination that is not one of the plurality of gear combinations of the predetermined shift path responsive to a third signal transmitted by the control unit; and
shift into one of the plurality of gear combinations of the predetermined shift path responsive to at least one of the first signal and the second signal transmitted by the control unit.

17. The electromechanical shifting system of claim 16, wherein the control unit comprises a first control unit configured to transmit the first signal and a second control unit configured to transmit the second signal.

18. The electromechanical shifting system of claim 17, wherein the first control unit comprises:
a first control processor configured to generate the first signal; and
a first control communication device configured to transmit the first signal;
and wherein the second control unit comprises:
a second control processor configured to generate the second signal; and
a second control communication device configured to transmit the second signal.

19. The electromechanical shifting system of claim 16, wherein the first gear changer and the second gear changer are further configured to shift into one of the plurality of gear combinations of the predetermined shift path responsive to the third signal.

20. The electromechanical shifting system of claim 19, wherein the first gear changer comprises:
- a first gear changer receiving device configured to receive the third signal;
- a first gear changer processor configured to control a first gear changer shift and to generate a fourth signal responsive to the first gear changer receiving device receiving the third signal; and
- the first gear changer processor configured to transmit the fourth signal, the fourth signal configured to control a second gear changer shift.

* * * * *